United States Patent
Clausse et al.

(10) Patent No.: US 10,664,780 B1
(45) Date of Patent: May 26, 2020

(54) ASSET MANAGEMENT FOR DECOMMISSIONING OFFSHORE PLATFORMS

(71) Applicant: Accenture Global Solutions Limited, Dublin (IE)

(72) Inventors: Jean Charles Clausse, London (GB); Davi C. Quintiere, Aberdeen (GB); Sam Mathew, Aberdeen (GB)

(73) Assignee: Accenture Global Solutions Limited, Dublin (IE)

( * ) Notice: Subject to any disclaimer, the term of this patent is extended or adjusted under 35 U.S.C. 154(b) by 708 days.

(21) Appl. No.: 15/226,363

(22) Filed: Aug. 2, 2016

Related U.S. Application Data

(60) Provisional application No. 62/205,190, filed on Aug. 14, 2015.

(51) Int. Cl.
*G06Q 10/00* (2012.01)
*G06Q 10/06* (2012.01)

(52) U.S. Cl.
CPC . *G06Q 10/06313* (2013.01); *G06Q 10/06314* (2013.01)

(58) Field of Classification Search
CPC .................. G06Q 10/06314; G06Q 10/06313
See application file for complete search history.

(56) References Cited

U.S. PATENT DOCUMENTS

| | | | | |
|---|---|---|---|---|
| 5,793,632 | A * | 8/1998 | Fad | G06Q 30/0283 705/400 |
| 8,676,721 | B2 * | 3/2014 | Piovesan | G06Q 10/00 706/11 |
| 9,691,046 | B1 * | 6/2017 | Adler | G06Q 10/06393 |
| 2001/0053311 | A1 * | 12/2001 | Jones | E02B 17/00 405/203 |
| 2002/0067958 | A1 * | 6/2002 | Seguin | B63B 9/065 405/223.1 |

(Continued)

OTHER PUBLICATIONS

"Offshore decommissioning cost estimation in the Gulf of Mexico", MJ Kaiser—Journal of construction engineering and management, 2006—ascelibrary.org (Year: 2006).*

(Continued)

*Primary Examiner* — Jonathan G Sterrett
(74) *Attorney, Agent, or Firm* — Harrity & Harrity, LLP

(57) ABSTRACT

A device may receive first information associated with an asset that is associated with a project. The device may determine a plurality of cost elements associated with the project based on the first information. The device may determine a plurality of sub-elements associated with the project based on the plurality of cost elements and the first information. The device may generate a plurality of hypotheses corresponding to the plurality of sub-elements. The device may receive second information associated with the hypotheses. The device may determine impact factors associated with the plurality of hypotheses based on the second information. The device may generate an estimate based on the impact factors. The device may determine a project execution date, associated with the project, based on the estimate. The device may cause an action to be performed in association with the asset based on the project execution date.

20 Claims, 14 Drawing Sheets

(56) References Cited

U.S. PATENT DOCUMENTS

| | | | | |
|---|---|---|---|---|
| 2005/0108084 | A1* | 5/2005 | Ramamoorti | G06Q 10/06 705/70 |
| 2005/0114829 | A1* | 5/2005 | Robin | G06Q 10/06 717/101 |
| 2006/0074789 | A1* | 4/2006 | Capotosto | G06Q 10/08 705/35 |
| 2006/0120809 | A1* | 6/2006 | Ingram | E02D 27/42 405/195.1 |
| 2006/0253205 | A1* | 11/2006 | Gardiner | G05B 15/02 700/19 |
| 2008/0255910 | A1* | 10/2008 | Bagchi | G06Q 10/06 705/7.28 |
| 2011/0178850 | A1 | 7/2011 | Stark et al. | |
| 2012/0253479 | A1* | 10/2012 | Radl | G05B 19/042 700/12 |
| 2015/0278734 | A1* | 10/2015 | Grant | G06Q 10/06313 705/7.23 |

OTHER PUBLICATIONS

"Cost development of future technologies for power generation—A study based on experience curves and complementary bottom-up assessments" L Neij—Energy policy, 2008—Elsevier (Year: 2008).*

Factors affecting contractors' risk of cost overburden B Akinci, M Fischer—Journal of Management in Engineering, 1998—ascelibrary.org (Year: 1998).*

Learning curves and technology assessment A McDonald, L Schrattenholzer—International Journal of . . . , 2002 —pure.iiasa.ac.at (Year: 2002).*

Learning curve models and applications: Literature review and research directions MJ Anzanello, FS Fogliatto—International Journal of Industrial Ergonomics, 2011—Elsevier (Year: 2011).*

Offshore wind energy installation and decommissioning cost estimation in the us outer continental shelf MJ Kaiser, B Snyder—US Dept. of the Interior, Bureau of Ocean Energy . . . , 2010—Citeseer (Year: 2010).*

Decommissioning of offshore platform: A sustainable framework NAWA Zawawi, MS Liew, KL Na—2012 IEEE Colloquium on . . . , 2012—ieeexplore.ieee.org (Year: 2012).*

Cost-oriented failure mode and effects analysis A von Ahsen—International Journal of Quality & Reliability . . . , 2008—emeraldinsight.com (Year: 2008).*

\* cited by examiner

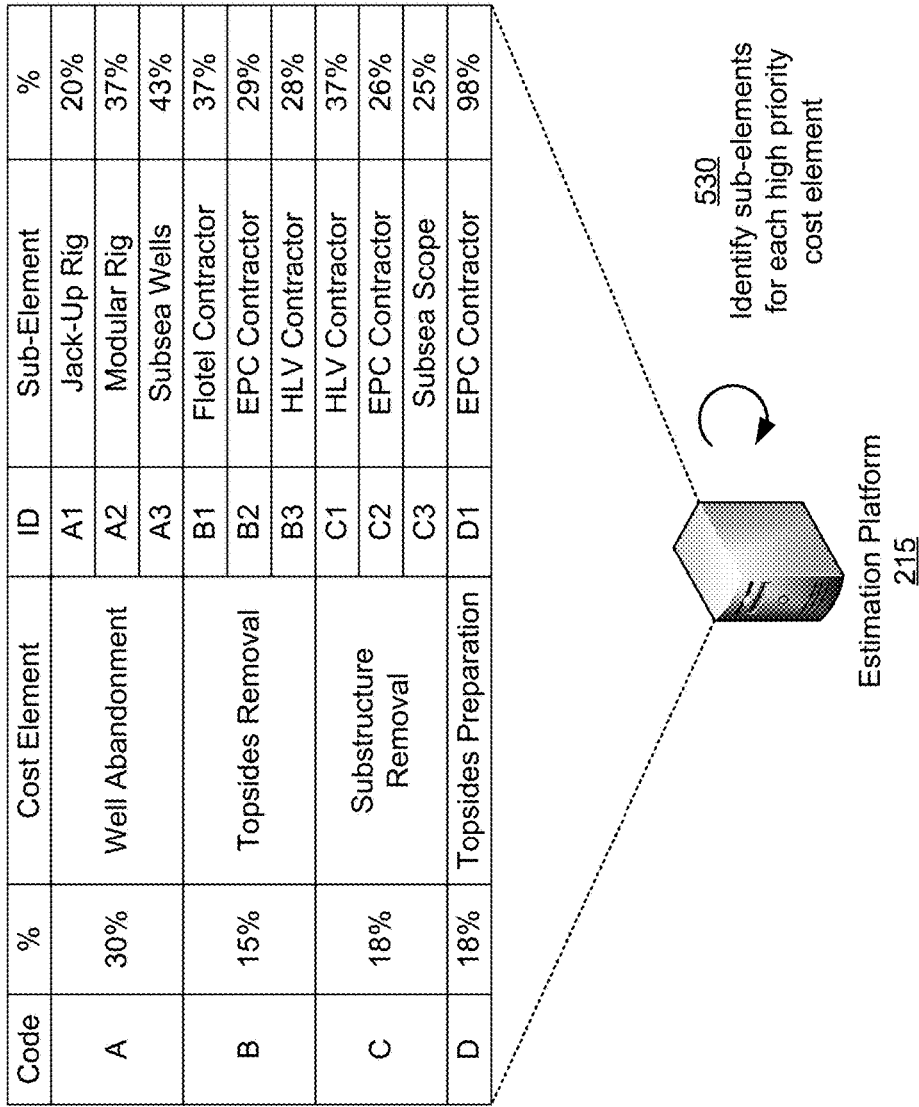

| | Category | | Future Factors |
|---|---|---|---|
| 1 | New Technology | 1.1 | New decommissioning centric technology |
| | | 1.2 | Technology disruption |
| 2 | Market | 2.1 | Entry/Exit of supply chain players |
| | | 2.2 | Increase/decrease in available capacity of existing players |
| | | 2.3 | Increase in supply chain decommissioning capabilities |
| | | 2.4 | New financing/operating models |
| 3 | Industry Maturity & Learning Effects | 3.1 | Reduced time to deliver |
| | | 3.2 | Reduced efforts to deliver |
| | | 3.3 | Increased quantity in delivery |
| | | 3.4 | Enhanced scope accuracy |
| 4 | Industry Partnership | 4.1 | Alliance with other operators for joint operations |
| | | 4.2 | Partnering with supply chain members for solution development |
| | | 4.3 | Supply chain members partnering to develop solutions |
| 5 | Methods | 5.1 | Development of decommissioning centric procedures/methods |

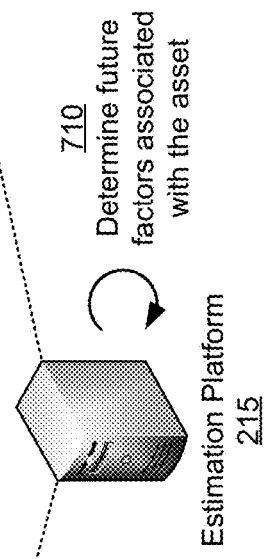

Estimation Platform
215

710
Determine future factors associated with the asset

FIG. 7A

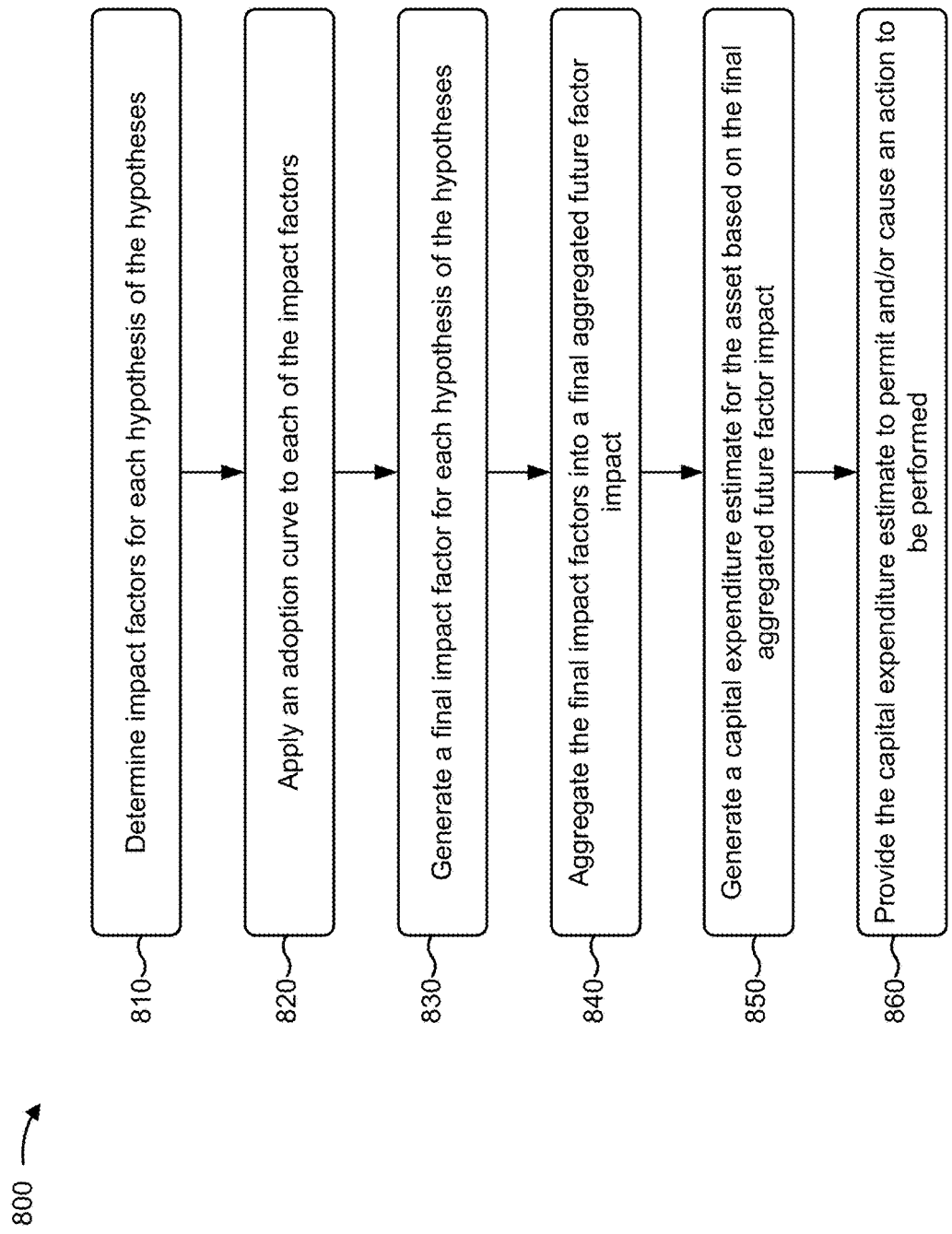

ASSET MANAGEMENT FOR DECOMMISSIONING OFFSHORE PLATFORMS

RELATED APPLICATION

This application claims priority under 35 U.S.C. § 119 to U.S. Provisional Patent Application No. 62/205,190, filed on Aug. 14, 2015, the content of which is incorporated by reference herein in its entirety.

BACKGROUND

An organization, company, or the like, may acquire and/or manage an asset and may incur capital expenditures to repair, upgrade, and/or adapt assets. In some cases, an asset may be decommissioned based on a lifespan of the asset and/or a capital expenditure may be incurred to decommission the asset.

SUMMARY

In some implementations, a device may receive, from one or more other devices and via a network, first information associated with an asset that is associated with a project. The device may determine a plurality of cost elements associated with the project based on the first information. The device may determine a plurality of sub-elements associated with the project based on the plurality of cost elements and the first information. The device may generate a plurality of hypotheses corresponding to the plurality of sub-elements. The device may receive, from the one or more other devices and via the network, second information associated with the hypotheses. The device may determine impact factors associated with the plurality of hypotheses based on the second information. The device may generate an estimate based on the impact factors. The device may determine a project execution date, associated with the project, based on the estimate. The device may cause an action to be performed in association with the asset based on the project execution date.

In some implementations, a non-transitory computer-readable medium may store one or more instructions that, when executed by one or more processors of a device, cause the one or more processors to receive, from one or more other devices and via a network, first information associated with an asset. The one or more instructions may cause the one or more processors to determine a plurality of cost elements associated with the asset based on the first information. The one or more instructions may cause the one or more processors to determine a plurality of sub-elements associated with the asset based on the cost elements and the first information. The one or more instructions may cause the one or more processors to generate hypotheses based on the sub-elements. The one or more instructions may cause the one or more processors to receive, from the one or more other devices and via the network, second information associated with the hypotheses. The one or more instructions may cause the one or more processors to determine first impact factors associated with the hypotheses based on the second information. The one or more instructions may cause the one or more processors to generate a first estimate based on the first impact factors. The one or more instructions may cause the one or more processors to receive, from the one or more other devices and via the network, third information associated with the hypotheses. The one or more instructions may cause the one or more processors to determine second impact factors associated with the hypotheses based on the third information. The one or more instructions may cause the one or more processors to generate a second estimate based on the third information. The one or more instructions may cause the one or more processors to compare the first estimate and the second estimate. The one or more instructions may cause the one or more processors to determine a target execution date based on comparing the first estimate and the second estimate. The one or more instructions may cause the one or more processors to provide, to another device, of the one or more other devices, and via the network, a message that causes the other device to perform an action in association with the asset based on the target execution date.

In some implementations, a method may include receiving, by a device and from another device via a network, information associated with an asset. The method may include identifying, by the device and based on the information associated with the asset, a set of cost elements relating to the asset. The method may include filtering, by the device, the set of cost elements to form a list of high priority cost elements. The high priority cost elements may be associated with values that satisfy a threshold value. The method may include analyzing, by the device, the list of high priority cost elements to identify sub-elements for the high priority cost elements of the list. The method may include determining, by the device, a plurality of future factors, associated with the asset, based on the sub-elements and the list of high priority cost elements. The method may include generating, by the device, hypotheses for one or more future factors of the plurality of future factors. The method may include determining, by the device, impact factors for one or more hypotheses of the hypotheses. The method may include applying, by the device, an adoption curve to one or more impact factors of the impact factors. The method may include generating, by the device, one or more final impact factors for the one or more hypotheses, of the hypotheses, based on applying the adoption curve to the one or more impact factors. The method may include aggregating, by the device, the one or more final impact factors into a final aggregated future factor impact. The method may include generating, by the device, a capital expenditure estimate for the asset based on the final aggregated future factor impact. The method may include providing, by the device and for display, the capital expenditure estimate.

BRIEF DESCRIPTION OF THE DRAWINGS

FIGS. 5A and 5B are diagrams of an example implementation relating to the example process shown in FIG. 4;

FIGS. 7A and 7B are diagrams of an example implementation relating to the example process shown in FIG. 6;

FIG. 8 is a flow chart of an example process for generating a capital expenditure estimate based on impact factors associated with the hypotheses.

DETAILED DESCRIPTION

Figure 1A:
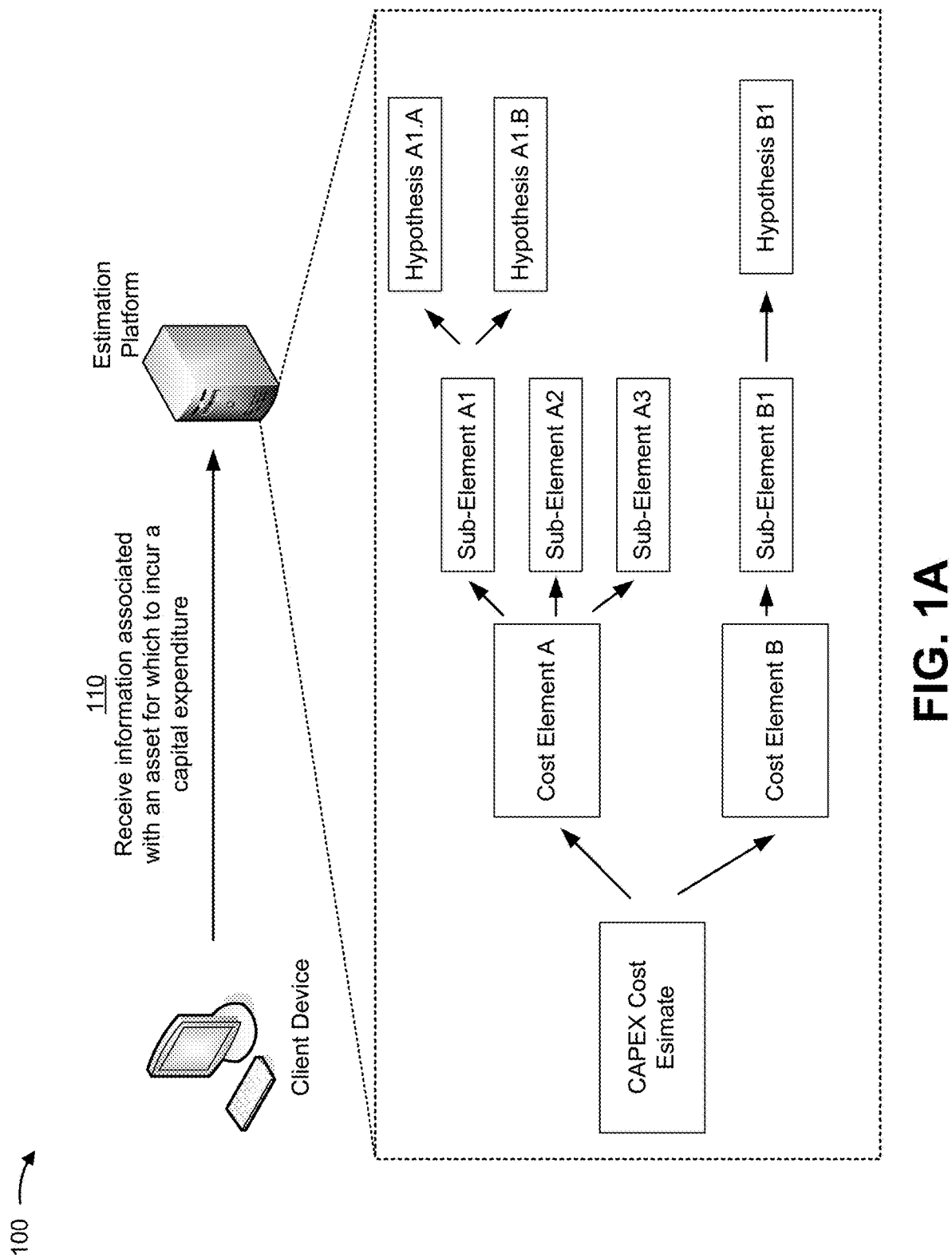
FIGS. 1A and 1B are diagrams of an overview of an example implementation described herein.

The following detailed description of example implementations refers to the accompanying drawings. The same reference numbers in different drawings may identify the same or similar elements.

A capital expenditure may include an expenditure incurred by a company to acquire or upgrade physical assets, such as property, industrial buildings, equipment, or the like, and is often used to undertake new projects or investments. For example, in the upstream oil and gas industry, a company may acquire or upgrade assets, such as offshore platforms, equipment on offshore platforms, or the like. A part of a capital expenditure project is a cost estimation of future project execution, which is carried out prior to the start of actual project execution. Long-range cost estimates are prepared with a goal to cover all future project execution activities. These cost estimates are crucial since they play a major role in deciding a success of project execution.

The cost estimation process is not a straightforward process since it involves estimating costs of completing activities that will be executed far in the future (e.g., 10-15 years or even 25-30 years) from the time of estimation. There are multiple factors that can affect or alter long-range project cost estimates over the course of time. For example, technology disruption is one of the main factors that may alter long-range project cost estimates. Other factors include entry or exit of supply chain entities in activities directly linked to project execution, increase of collaborative efforts between companies and the supply chain entities to better project delivery, experience through increased exposure to work conditions or work execution, or the like.

The future factors described above have the potential to significantly alter project execution costs and long-range estimates, but are currently accounted for only in a limited manner in the cost estimation process by organizations. As a result of this, organizations end up creating estimates that may either underestimate or overestimate the cost of project execution. In either case, this approach presents problems for companies since the approach directly impacts cash flow. In some cases, the approach ties up capital which could otherwise be used more productively towards business furthering activities.

Implementations described herein may identify cost elements and sub-elements associated with a capital expenditure project, determine future factors for the sub-elements, generate hypotheses for the future factors, and determine impact factors associated with the hypotheses. Additionally, implementations described herein may generate a capital expenditure estimate based on applying the impact factors to the sub-elements, thereby estimating effects of the hypotheses on a cost estimate associated with the capital expenditure project. In this way, implementations described herein may more accurately estimate the effects of future factors on cost estimates associated with capital expenditure projects, thereby enabling more informed decision making throughout a capital expenditure project execution lifespan.

While some implementations described herein are described in terms of a decommissioning project associated with offshore platforms, implementations described herein may be applied to other capital expenditure projects. In practice, these implementations may be used in conjunction with other types of capital expenditure projects that are associated with cost estimates and/or future factors.

Figure 1B:
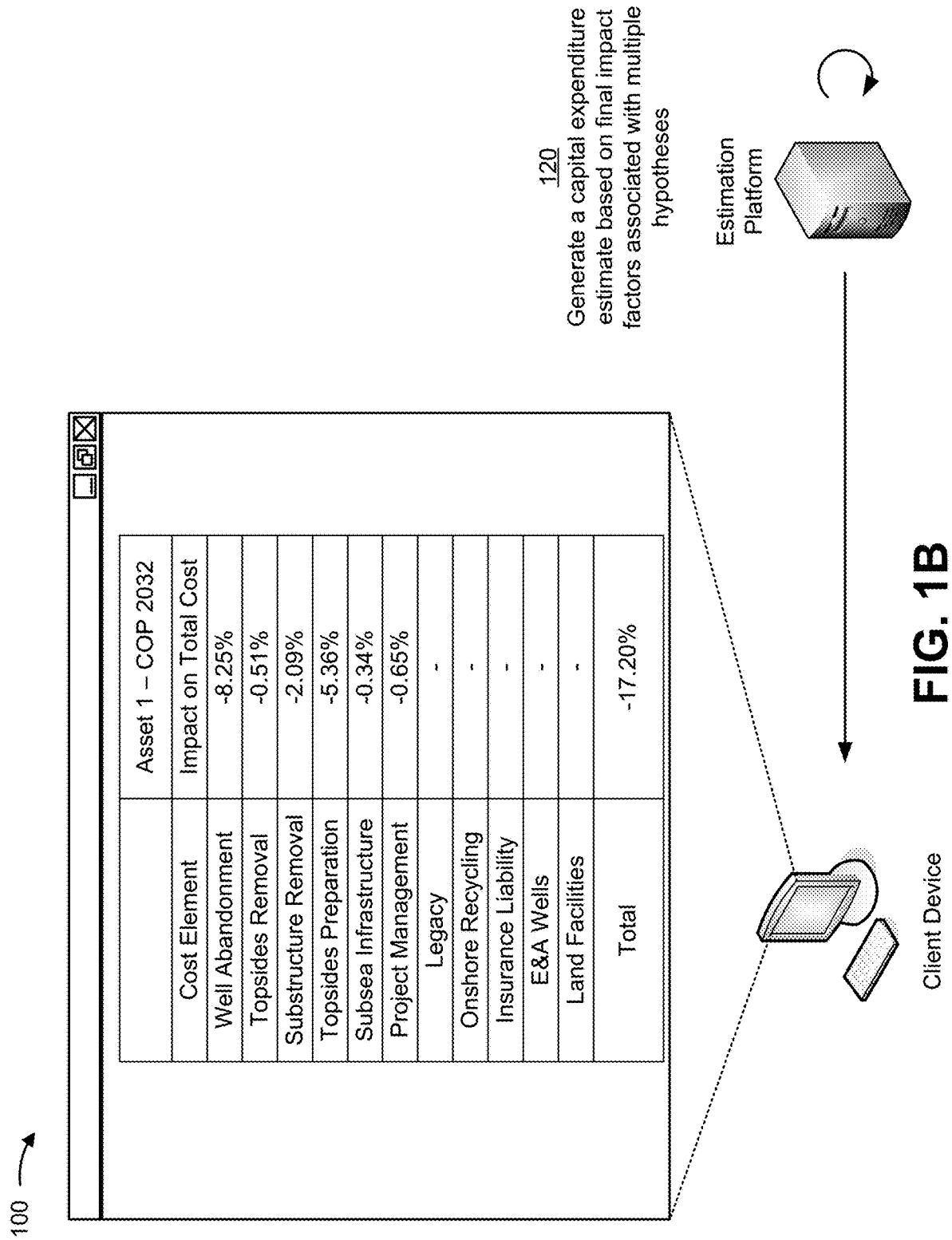

FIGS. 1A and 1B are diagrams of an overview of an example implementation 100 described herein. As shown in FIG. 1A, and by reference number 110, an estimation platform (e.g., a cloud server) may receive information associated with an asset for which to incur a capital expenditure. For example, assume that a capital expenditure project is associated with decommissioning an offshore platform. Assume that the information includes a decommissioning cost estimate, a breakdown of the cost estimate into particular cost elements associated with the capital expenditure project (e.g., based on an industry framework, such as an Oil and Gas Industry framework), and/or values associated with each cost element.

As an example, a cost element may represent a constituent part of the decommissioning project (e.g., may include a well abandonment portion, a topsides portion, and/or other portions associated with the decommissioning project). Additionally, assume that each cost element may be associated with a particular contribution percentage value to an overall cost associated with the decommissioning project. For example, a cost element associated with well abandonment may constitute 30% of an overall cost associated with the decommissioning project.

As shown, the estimation platform may identify and/or store (e.g., in a data structure) information associated with an overall cost estimate, cost elements, sub-elements, and/or hypotheses associated with the decommissioning project. A sub-element may represent a constituent part of a cost element. As an example, a particular cost element (e.g., topsides removal) may be associated with particular workscopes (e.g., engineering down and cleaning, heavy lifting, and accommodation) and particular contractors (e.g., engineering, procurement, and construction (EPC) contractors, heavy lift vessel (HLV) contractors, and floating hotel (flotel) contractors). The particular contractors may form the sub-elements under the topsides removal cost element. In another example, for another particular cost element (e.g., wells abandonment), the estimation platform may classify the sub-elements based on types of operations used for the cost element (e.g., platform wells with a jack-up rig, platform wells with a modular rig, and subsea wells).

A hypothesis may represent an estimation as to future technology, methods, processes, legislation, or the like, that may result in an effect on a cost estimate associated with a capital expenditure project. As an example, a particular hypothesis (e.g., "usage of autonomous inspection vehicles (ATVs)/autonomous underwater vehicles (AUVs) for pre-cutting surveys") may be associated with a potential impact (e.g., −70%) on a particular cost element (e.g., substructure removal). For example, the hypothesis indicates that if AIVs/AUVs become available for use in association with pre-cutting surveys, then costs associated with substructure removal may be reduced by 70%. The estimation platform may map a hypothesis to a sub-element, such that a potential effect of the hypothesis is accurately reflected in a cost estimate associated with the capital expenditure project.

As shown in FIG. 1B, and by reference number 120, the estimation platform may generate a capital expenditure estimate based on final impact factors associated with multiple hypotheses. A final impact factor, associated with a hypothesis, may represent an effect of the hypothesis, on a cost estimate associated with a capital expenditure project, based on an application of impact conditions and/or an adoption curve, as described elsewhere herein. As an example, an impact condition may include a probability value and/or a confidence value. For example, a probability value may represent a likelihood that the hypothesis reaches fruition. Additionally, a confidence value may represent confidence in evidence associated with a particular hypothesis.

An adoption curve may include an adoption percentage value that indicates that, for a particular temporal indicator (e.g., date and/or time), a percentage of a market, industry, or the like, has adopted a technology, method, or the like, associated with a hypothesis. Additionally, an adoption curve may include an impact maturity value that indicates that, for a given temporal indicator, a particular percentage of a benefit associated with a hypothesis is realized. As explained elsewhere herein, the estimation platform may determine final impact factors associated with multiple hypotheses based on applying impact conditions and/or adoption curves.

As shown, the estimation platform may generate a capital expenditure estimate based on aggregating final impact factor values, associated with hypotheses, such that final future factor impact values associated with multiple cost elements are determined. For example, as shown, the estimation platform may determine that, for a particular project execution date (e.g., cessation of production (COP) slated for 2032), a final future factor impact value associated with a particular cost element (e.g., "well abandonment") may be −8.25%. Thus, the estimation platform may determine that, based on applying final impact factor values associated with the hypotheses, that costs associated with the well abandonment cost element may be reduced by 8.25% for a project execution date of 2032. Additionally, as shown, the estimation platform may aggregate final future factor impact values, associated with the cost elements, and determine a final aggregated future factor impact value (e.g., −17.20%). For example, the estimation platform may determine that an overall cost associated with decommissioning an offshore platform may be reduced by 17.20% if the project is executed in 2032.

In this way, the estimation platform may generate a capital expenditure estimate for a particular project execution date, and may provide the capital expenditure estimate to a client device (e.g., a desktop computer) such that an analyst (e.g., a user) may determine a project execution date (e.g., may make an informed decision as to a project execution date based on estimated costs).

Implementations described herein may enable an estimation platform to determine capital expenditure estimates for assets based on future factors, such as advancements in technology, processes, methodologies, legislation, or the like. The estimation platform may identify, validate, and/or finalize the effects of such future factors on capital expenditure estimates for an asset. The estimation platform may simulate scenarios for different project execution dates and for different applicability of future factors, and may determine a resulting effect on capital expenditure project costs. Thus, implementations described herein may enable informed decision making throughout the lifespan of a capital expenditure project. Additionally, implementations described herein may reduce a quantity of computations relating to capital expenditure project estimates, thereby conserving processor and/or memory resources of devices associated with a capital expenditure project.

As indicated above, FIGS. 1A and 1B are provided merely as an example. Other examples are possible and may differ from what was described with regard to FIGS. 1A and 1B.

Figure 2:
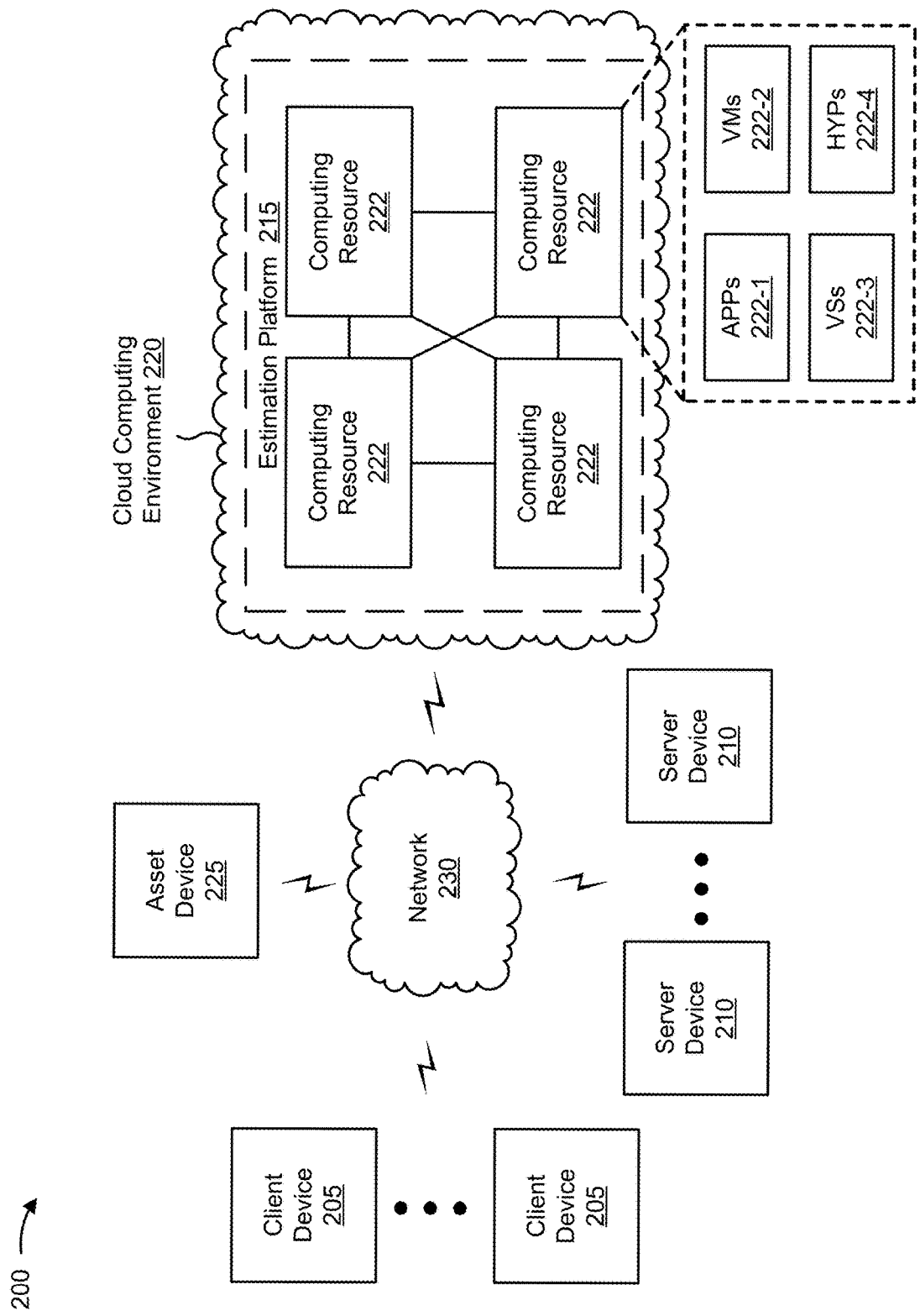
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include one or more client devices 205 (hereinafter referred to collectively as "client devices 205," and individually as "client device 205"), one or more server devices 210 (hereinafter referred to collectively as "server devices 210," and individually as "server device 210"), an estimation platform 215 hosted within a cloud computing environment 220, an asset device 225, and a network 230. Devices of environment 200 may interconnect via wired connections, wireless connections, or a combination of wired and wireless connections.

Client device 205 includes one or more devices capable of receiving, generating, storing, processing, and/or providing information associated with estimation platform 215. For example, client device 205 may include a computing device, such as a desktop computer, a laptop computer, a tablet computer, a server device, a mobile phone (e.g., a smart phone or a radiotelephone) or a similar type of device. In some implementations, client device 205 may display a user interface. Additionally, or alternatively, client device 205 may receive input from a project analyst (e.g., a user).

Server device 210 includes one or more devices capable of receiving, storing, and/or providing information for use by estimation platform 215. For example, server device 210 may include a server or a group of servers (e.g., a cloud-based server, an application server, a content server, a host server, a web server, etc.), a desktop computer, or a similar device. In some implementations, server device 210 may provide information associated with a capital expenditure project to estimation platform 215.

Estimation platform 215 includes one or more devices capable of receiving information associated with a capital expenditure project, identifying cost elements and sub-elements, determining future factors, generating hypotheses, applying impact conditions and/or an adoption curve to the hypotheses, and/or generating a capital expenditure estimate associated with the capital expenditure project. For example, estimation platform 215 may include a cloud server or a group of cloud servers. In some implementations, estimation platform 215 may be designed to be modular such that certain software components can be swapped in or out depending on a particular need. As such, estimation platform 215 may be easily and/or quickly reconfigured for different uses.

In some implementations, as shown, estimation platform 215 may be hosted in cloud computing environment 220. Notably, while implementations described herein describe estimation platform 215 as being hosted in cloud computing environment 220, in some implementations, estimation platform 215 may not be cloud-based (i.e., may be implemented outside of a cloud computing environment) or may be partially cloud-based.

Cloud computing environment 220 includes an environment that hosts estimation platform 215. Cloud computing environment 220 may provide computation, software, data access, storage, etc. services that do not require end-user (e.g., client device 205) knowledge of a physical location and configuration of system(s) and/or device(s) that hosts estimation platform 215. As shown, cloud computing environment 220 may include a group of computing resources 222 (referred to collectively as "computing resources 222" and individually as "computing resource 222").

Computing resource 222 includes one or more personal computers, workstation computers, server devices, or another type of computation and/or communication device.

In some implementations, computing resource 222 may host estimation platform 215. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown in FIG. 2, computing resource 222 includes a group of cloud resources, such as one or more applications ("APPs") 222-1, one or more virtual machines ("VMs") 222-2, virtualized storage ("VSs") 222-3, one or more hypervisors ("HYPs") 222-4, or the like.

Application 222-1 includes one or more software applications that may be provided to or accessed by client device 205. Application 222-1 may eliminate a need to install and execute the software applications on client device 205. For example, application 222-1 may include software associated with estimation platform 215 and/or any other software capable of being provided via cloud computing environment 220. In some implementations, one application 222-1 may send/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system. A process virtual machine may execute a single program, and may support a single process. In some implementations, virtual machine 222-2 may execute on behalf of a user (e.g., client device 205), and may manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 may provide hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

Asset device 225 includes one or more devices capable of generating, storing, processing, and/or providing information. For example, asset device 225 may include a computing device, such as a server, a desktop computer, a laptop computer, a tablet computer, a handheld computer, or a similar device. In some implementations, asset device 225 may include an asset (e.g., a device, a piece of equipment, a factory, an oil well, or the like) that may be associated with a project execution (e.g., automatically shut down) on a particular date and/or time based on instructions from estimation platform 215. For example, a project execution associated with asset device 225 may be triggered and/or controlled by estimation platform 215 (e.g., estimation platform 215 may be a scheduling device that causes a project to be executed).

Network 230 includes one or more wired and/or wireless networks. For example, network 230 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
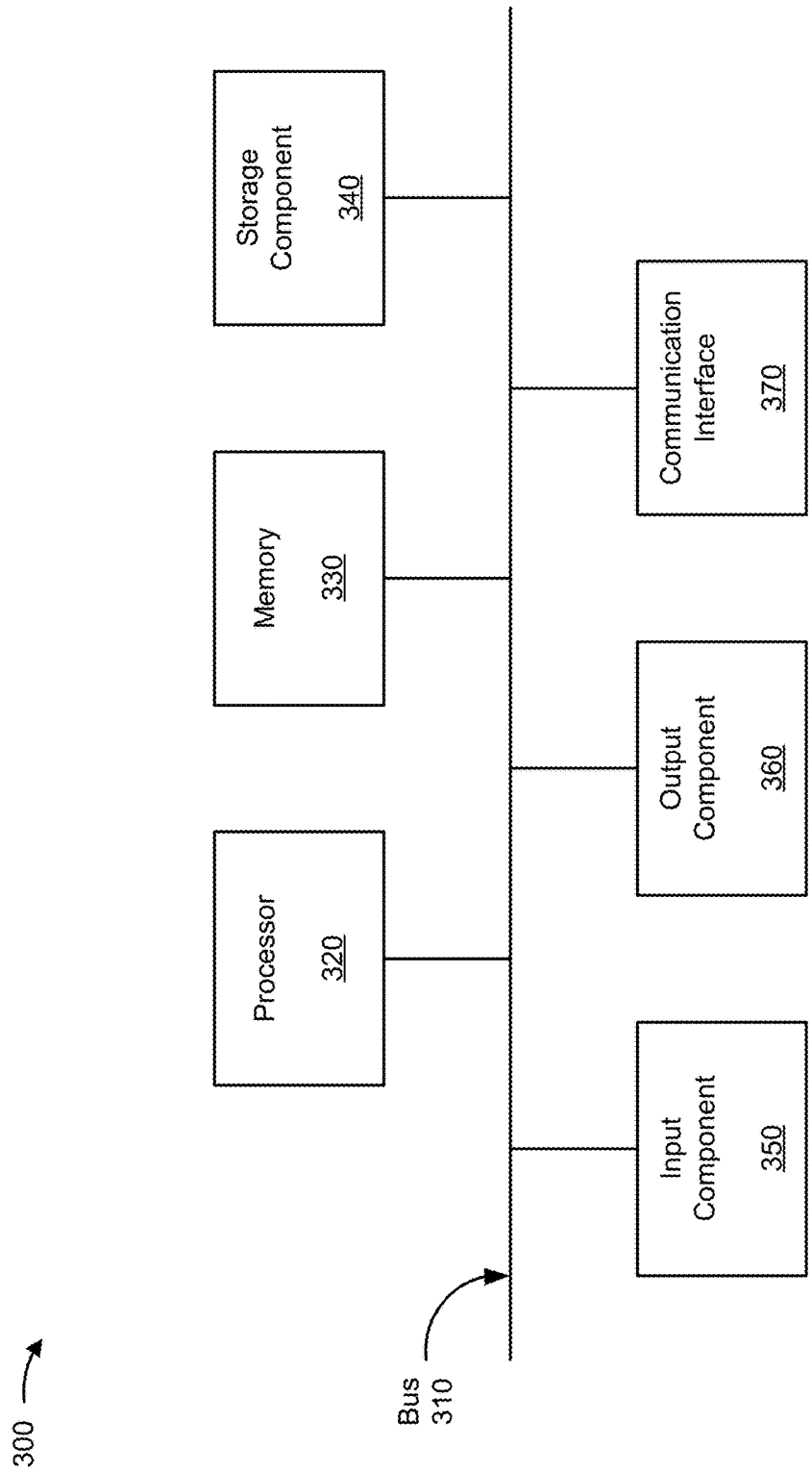
FIG. 3 is a diagram of example components of one or more devices of FIG. 2.

FIG. 3 is a diagram of example components of a device 300. Device 300 may correspond to client device 205, server device 210, estimation platform 215, and/or asset device 225. In some implementations, client device 205, server device 210, estimation platform 215, and/or asset device 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
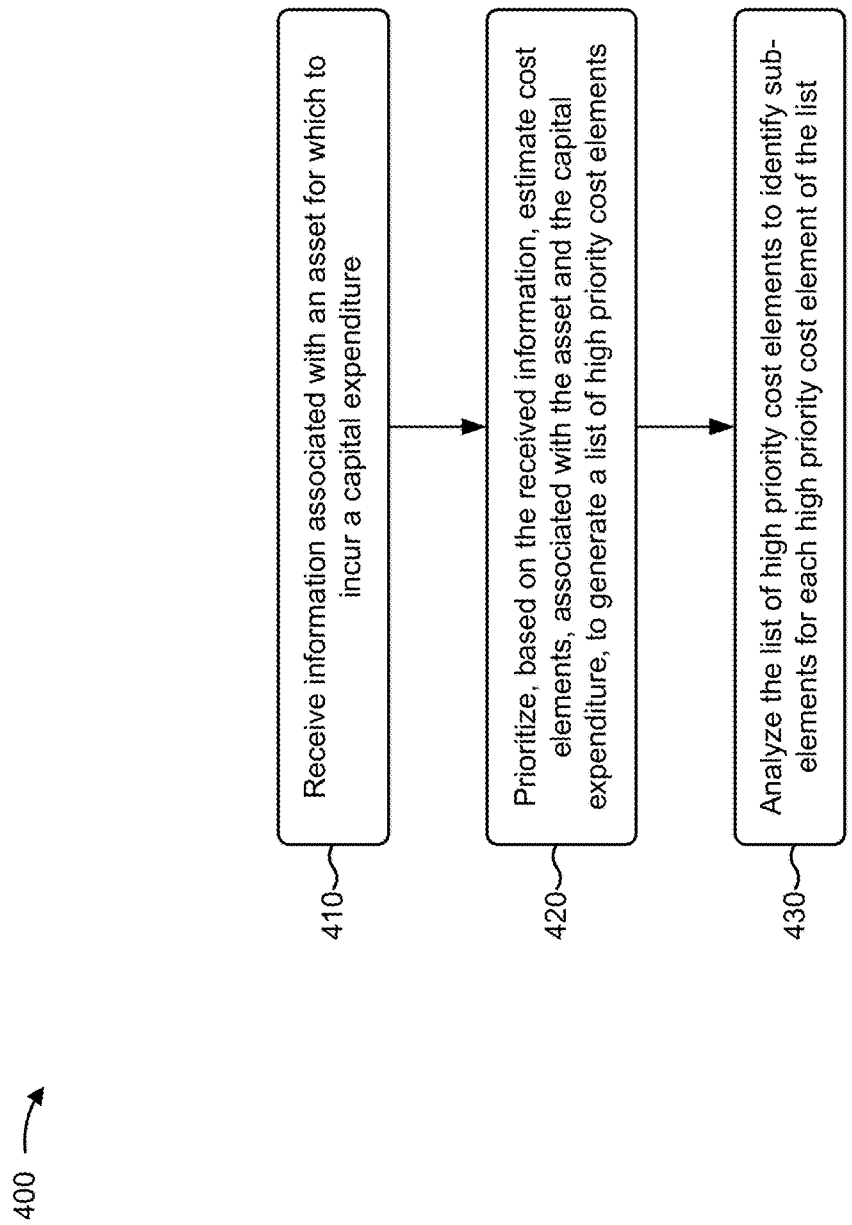
FIG. 4 is a flow chart of an example process for identifying high priority cost elements and sub-elements associated with an asset for which to incur a capital expenditure.

FIG. 4 is a flow chart of an example process 400 for identifying high priority cost elements and sub-elements associated with an asset for which to incur a capital expenditure. In some implementations, one or more process blocks of FIG. 4 may be performed by estimation platform 215. In some implementations, one or more process blocks of FIG. 4 may be performed by another device or a group of devices separate from or including estimation platform 215, such as client device 205, server device 210 and/or asset device 225.

As shown in FIG. 4, process 400 may include receiving information associated with an asset for which to incur a capital expenditure (block 410). For example, estimation platform 215 may receive, from client device 205 (e.g., which may have received an input from a user), information associated with an asset for which to incur a capital expenditure. Additionally, or alternatively, estimation platform 215 may receive information from server device 210. In some implementations, an asset may include an economic resource, such as a tangible or intangible item that may be owned and/or controlled to produce value and/or that may be held to have an economic value. A capital expenditure may include a usage of funds by an organization, entity, or the like, in association with an asset.

In some implementations, the information associated with the asset may include a capital expenditure project cost estimate. For example, a capital expenditure project may be associated with an estimated cost, an estimated execution date and/or time, or the like, and/or may be associated with an estimated cost that may be dependent on a particular execution date and/or time. In some implementations, a capital expenditure project may be associated with one or more assets, and/or may include cost estimates corresponding to each of the one or more assets. In some implementations, estimation platform 215 may receive information that identifies a value (e.g., a monetary value) associated with a capital expenditure project cost estimate. In some implementations, estimation platform 215 may receive information associated with an asset that is associated with a particular capital expenditure project execution date and/or time (e.g., greater than five years from a present date, or the like).

In some implementations, the information associated with the asset may include one or more cost elements. A cost element may include a constituent part of the capital expenditure project cost estimate. For example, a capital expenditure project may be associated with multiple stages, milestones, events, tasks, responsibilities, or the like, that may each correspond to a cost element, respectively. Additionally, values associated with multiple cost elements, when aggregated, may constitute a value associated with a capital expenditure project cost estimate.

In some implementations, estimation platform 215 may identify one or more cost elements based on information that identifies a work breakdown structure, an asset-wise cost estimate, a scope of work, and industry framework, one or more areas of spending associated with the capital expenditure project, or the like. In some implementations, estimation platform 215 may provide, to a particular server device 210, a request for information associated with a capital expenditure project. For example, estimation platform 215 may provide a request for information that identifies an industry framework and/or standard (e.g., information that identifies cost elements, or potential cost elements, associated with the capital expenditure project), legislative guidelines associated with the capital expenditure project, or the like. As an example, assume that the capital expenditure project is associated with decommissioning an offshore platform. In this case, estimation platform 215 may provide a request for information that identifies industry standards, guidelines, or the like, associated with decommissioning the particular type of offshore platform. In some implementations, estimation platform 215 may receive, from server device 210, information associated with the capital expenditure project based on the request. Additionally, estimation platform 215 may identify cost elements based on the received information (e.g., may identify cost elements based on parsing the received information).

Additionally, or alternatively, estimation platform 215 may provide, to server device 210, a request for information associated with other capital expenditure projects. For example, assume that server device 210 includes a database that stores information associated with other capital expenditure projects (e.g., capital expenditure projects associated with a company that is involved with the capital expenditure project). In this case, estimation platform 215 may provide a request for information associated with the other capital expenditure projects (e.g., other projects associated with a particular type of asset, or the like). Additionally, estimation platform 215 may receive, from server device 210, information associated with the other capital expenditure projects, and may identify cost elements based on the received information (e.g., may identify cost elements associated with related capital expenditure projects).

Additionally, or alternatively, estimation platform 215 may receive, from client device 205 (e.g., which may have received an input from a user), information associated with the capital expenditure project. For example, client device 205 may provide, to estimation platform 215, information that identifies a work breakdown structure (e.g., information that delineates tasks, sections, phases, or the like, associated with a capital expenditure project), identifies a project scope (e.g., work that may need to be completed for the capital expenditure project, tasks associated with particular contractors, and/or equipment associated with the capital expenditure project), or the like. Additionally, estimation platform 215 may identify cost elements based on the received information.

Additionally, or alternatively, estimation platform 215 may provide, to a particular server device 210 and/or particular server devices 210 via network 230, a request for information associated with an asset, information associated with a company, contractor, organization, governing body, or the like, associated with the capital expenditure project, or the like. Additionally, estimation platform 215 may receive, from server device 210 or server devices 210, information based on the request. Additionally, estimation platform 215 may determine cost elements associated with the capital expenditure project based on the received information.

Additionally, or alternatively, estimation platform 215 and/or server device 210 may provide, to client device 205 (e.g., which may provide for display via a user interface), information that identifies particular cost elements. Additionally, client device 205 may provide the information that identifies the particular cost elements, and may receive a selection of one or more cost elements (e.g., based on a user interaction with a menu, a check box, or the like). In some implementations, estimation platform 215 may receive, from client device 205, information that identifies one or more cost elements.

In some implementations, estimation platform 215 may receive information that identifies a value associated with a cost element. For example, estimation platform 215 may receive, from client device 205 and/or server device 210, information that identifies a monetary value, a contribution percentage value of a cost element to a capital expenditure project cost estimate, or the like. Additionally, or alternatively, estimation platform 215 may receive information that identifies a variance factor associated with a cost element. For example, a variance factor may indicate a degree to which a value associated with a cost element may fluctuate. Estimation platform 215 may identify constituent cost elements associated with a capital expenditure project cost estimate, and may prioritize the cost elements, as described below.

As further shown in FIG. 4, process 400 may include prioritizing, based on the received information, estimate cost elements, associated with the asset and the capital expenditure, to generate a list of high priority cost elements (block 420). For example, estimation platform 215 may generate a list of high priority cost elements based on values and/or variance factors associated with the cost elements. In some implementations, a high priority cost element may include a cost element that is associated with a particular value, a particular variance factor, or the like.

In some implementations, estimation platform 215 may generate the list of high priority cost elements based on identifying a particular quantity of cost elements that are associated with particular values (e.g., the top fifteen cost elements associated with the highest values, or the like), identifying a particular quantity of cost elements that are associated with values that satisfy a threshold value (e.g., include values that are greater than 5% of the overall capital expenditure project cost estimate, or the like), identifying a particular quantity of cost elements that are associated with particular variance factors, or the like.

In some implementations, estimation platform 215 may provide, to client device 205, information that identifies the list of high priority cost elements. Additionally, or alternatively, estimation platform 215 may receive, from client device 205, a validation of the list of the high priority cost elements. Additionally, estimation platform 215 may analyze the list of high priority cost elements based on receiving the validation of the list, as described below.

As further shown in FIG. 4, process 400 may include analyzing the list of high priority cost elements to identify sub-elements for each high priority cost element of the list (block 430). For example, estimation platform 215 may identify one or more sub-elements associated with each high priority cost element based on analyzing the list of high priority cost elements. In some implementations, a sub-element may include a constituent part of a cost element, such that a cost element is associated with multiple sub-elements. For example, values associated with sub-elements, when aggregated, may constitute a value associated with a cost element.

In some implementations, estimation platform 215 may identify sub-elements based on the received information associated with the asset (e.g., based on a work breakdown structure, or the like). In some implementations, estimation platform 215 may provide a request, to server device 210, for information associated with the capital expenditure project, and may receive information associated with the asset and/or the capital expenditure project based on the request. For example, estimation platform 215 may provide a request for information in a similar manner as described above in connection with block 410. In some implementations, a sub-element may be associated with a value (e.g., a monetary value, a contribution percentage value to a high priority cost element, or the like). Additionally, estimation platform 215 may identify a particular quantity of sub-elements, associated with a high priority cost element, based on values associated with the sub-elements. In some implementations, estimation platform 215 may map a value associated with a sub-element to a high priority cost element. For example, a value associated with a sub-element may be associated with a particular contribution percentage value to a high priority cost element (e.g., may constitute a particular percentage of a value associated with a high priority cost element).

In some implementations, estimation platform 215 may provide, to client device 205, information that identifies a list of sub-elements. Additionally, estimation platform 215 may provide, to client device 205, corresponding values (e.g., contribution percentage values to a high priority cost element value) associated with one or more sub-elements. Additionally, estimation platform 215 may receive, from client device 205, a validation of the list of sub-elements and/or the corresponding values associated with the sub-elements.

In some implementations, a sub-element may be associated with a sub-element identifier (e.g., a designation that identifies a particular sub-element). As described elsewhere herein, estimation platform 215 may apply a hypothesis and/or an impact factor to a sub-element based on a sub-element identifier. Estimation platform 215 may more accurately estimate an impact of a particular hypothesis on a value associated with a high priority cost element, as described elsewhere herein. Additionally, or alternatively, a sub-element may be associated with a type of asset. For example, assume that a capital expenditure project includes multiple assets that may be of different types. In this case, a particular sub-element may be associated with a particular type of asset, and/or may not be applicable to another type of asset.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
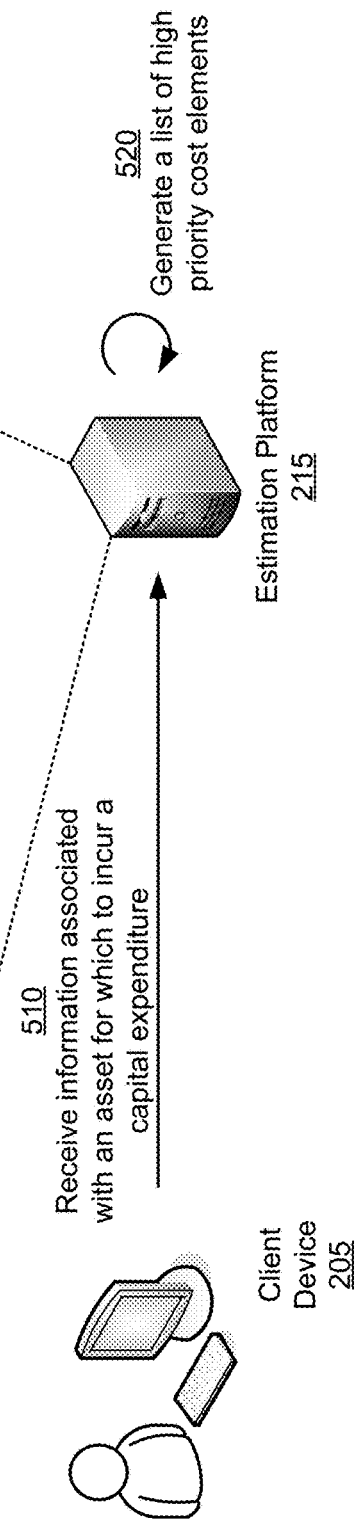

FIGS. 5A and 5B are diagrams of an example implementations 500 relating to example process 400 shown in FIG. 4. FIGS. 5A and 5B show an example of identifying high priority cost elements and sub-elements associated with an asset for which to incur a capital expenditure. Assume that FIGS. 5A and 5B include estimation platform 215 and client device 205 (e.g., which is being used by a user).

As shown in FIG. 5A, and by reference number 510, estimation platform 215 receives, from client device 205, information associated with an asset for which to incur a capital expenditure. For example, assume that a capital expenditure project is associated with decommissioning an offshore platform. The information may identify multiple cost elements associated with the capital expenditure project and may identify a contribution percentage value of each cost element to a total cost estimate value associated with the capital expenditure project. As shown, the information may include cost elements associated with well abandonment, topsides removal, substructure removal, and other portions associated with the capital expenditure project. For example, the cost element associated with "well abandonment" may constitute 30% of an overall capital expenditure project cost. As shown by reference number 520, estimation platform 215 may generate a list of high priority cost elements. For example, estimation platform 215 may identify cost elements that are associated with particular values (e.g., greater than 10% of the overall cost of the capital expenditure project).

As shown in FIG. 5B, and by reference number 530, estimation platform 215 may identify sub-elements for each high priority cost element. As shown, the high priority cost element "topsides removal" is associated with three sub-elements (e.g., "flotel contractor," "EPC contractor," and "HLV contractor"). For example, flotel, EPC, and HLV contractors may be associated with work-scopes associated with the topsides removal portion of the capital expenditure project. Additionally, as shown, each sub-element may be associated with a percentage contribution value to a high priority cost element. For example, as shown, the sub-element "flotel contractor" may be associated with 37% of a cost associated with the high priority cost element "topsides removal." Additionally, as shown, each sub-element may be associated with a sub-element identifier. For example, the sub-element "flotel contractor" may be associated with the sub-element identifier "B 1." Estimation platform 215 may determine future factors and hypotheses for the future factors based on the high priority cost elements and the corresponding sub-elements.

As indicated above, FIGS. 5A and 5B are provided merely as an example. Other examples are possible and may differ from what was described with regards to FIGS. 5A and 5B.

Figure 6:
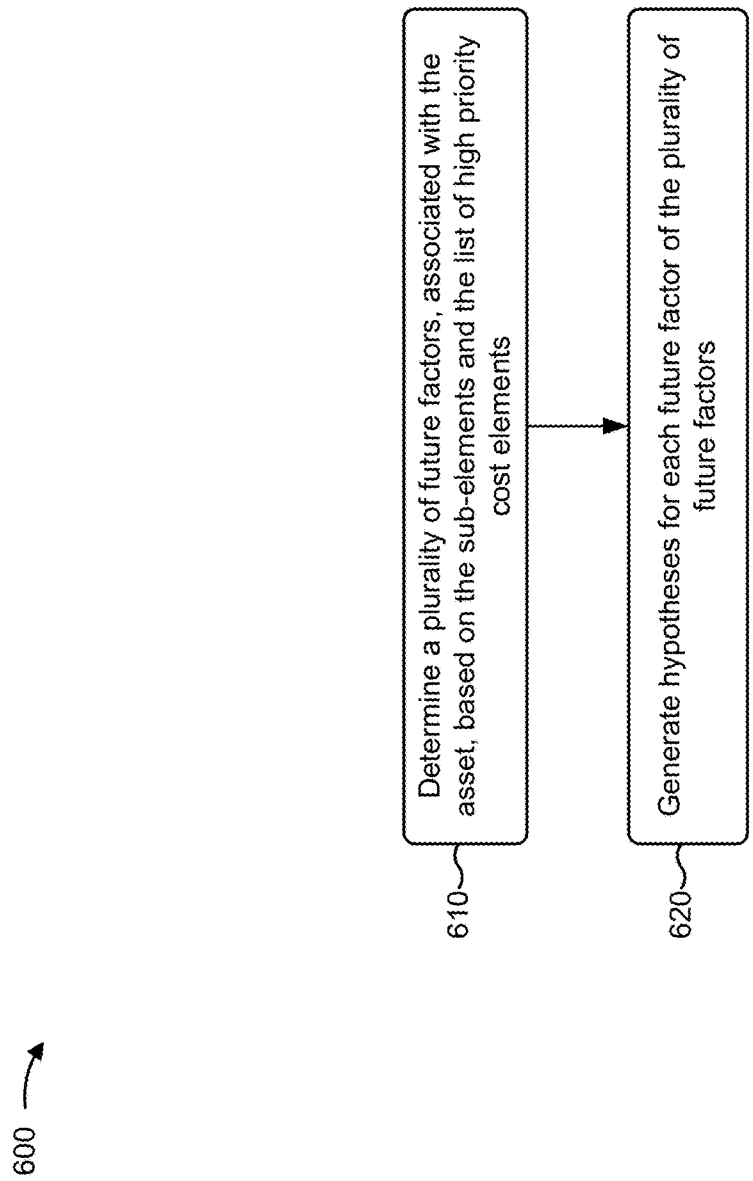
FIG. 6 is a flow chart of an example process for determining future factors associated with an asset, and generating hypotheses for the future factors.

FIG. 6 is a flow chart of an example process 600 for determining future factors associated with an asset, and generating hypotheses for the future factors. In some implementations, one or more process blocks of FIG. 6 may be performed by estimation platform 215. In some implementations, one or more process blocks of FIG. 6 may be performed by another device or a group of devices separate from or including estimation platform 215, such as client device 205, server device 210 and/or asset device 225.

As shown in FIG. 6, process 600 may include determining a plurality of future factors, associated with the asset, based on the sub-elements and the list of high priority cost elements (block 610). For example, estimation platform 215 may determine a plurality of future factors that may affect a capital expenditure project cost estimate based on the sub-elements and the list of high priority cost elements. In some implementations, a future factor may include a factor that may affect a capital expenditure project cost estimate, such as advancements in technology, new methodologies and/or processes, legislation, government regulations, or the like. Additionally, a future factor may be associated with a future factor category. For example, a future factor category may include a facet associated with a capital expenditure project that may be affected by future developments, improvement, optimizations, or the like.

In some implementations, estimation platform 215 may receive, from client device 205, information that identifies a future factor category and/or a future factor, and may determine the future factors based on the received information. For example, an analyst (e.g., a user) may conduct research and identify future factor categories and/or future factors associated with a capital expenditure project, and may input, via client device 205, information that identifies the future factor categories and/or future factors. In some implementations, estimation platform 215 may provide, to client device 205, a list of future factor categories and/or future factors, and may receive a validation of the list.

Additionally, or alternatively, estimation platform 215 may receive, from server device 210, information that identifies future factor categories and/or future factors associated with the high priority cost elements and/or sub-elements. For example, estimation platform 215 may provide, to server device 210, a request for information that identifies a future factor category and/or future factor, and may receive the information based on the request.

As further shown in FIG. 6, process 600 may include generating hypotheses for each future factor of the plurality of future factors (block 620). For example, estimation platform 215 may generate a hypothesis, for a future factor, that may be used to estimate an effect on a capital expenditure project cost estimate. In some implementations, a hypothesis may include a particular instance of a future factor, and may represent a potential effect of a future factor on a capital expenditure project cost estimate.

In some implementations, estimation platform 215 may generate a hypothesis based on receiving, from client device, information that identifies a hypothesis. For example, client device 205 may provide for display (e.g., via a menu, such as a drop-down menu, a check box, or the like), a list of hypotheses associated with one or more future factors, and may receive information that identifies a selection of one or more hypotheses. Additionally, or alternatively, client device 205 may receive input that identifies a hypothesis, and may provide information that identifies the hypothesis to estimation platform 215. In some implementations, client device 205 may receive, from server device 210, a list of hypotheses that may be associated with particular future factors, and may provide the hypotheses for display. For example, server device 210 may store information that identifies hypotheses associated with other capital expenditure projects, other assets, or the like, and may provide, to client device 205 and/or estimation platform 215, information that identifies the hypotheses.

Additionally, or alternatively, estimation platform 215 may generate a hypothesis based on receiving information associated with the asset and/or the capital expenditure project. For example, estimation platform 215 may receive information, such as a file (e.g., a text file, a file that includes text and other information, such as images), a document (e.g., a text document, a web document, such as a web page, a technical document, an industry document, a legislative document, a court document, or the like), or the like, and may process the information. In some implementations, estimation platform 215 may receive and/or process the information using a technique (e.g., a data mining technique, a web crawling technique, a web scraping technique, a natural language text processing technique, or the like), and may generate a hypothesis based on processing the information. For example, estimation platform 215 may identify topics, themes, terms, sentiments, or the like, that are associated with a future factor category, and may generate a hypothesis based on the identified topics, themes, terms, or the like.

In some implementations, a hypothesis may be associated with a potential impact, which may include an amount by which a value associated with a sub-element may be affected. For example, a potential impact may include a percentage change (e.g., reduction) in cost associated with a sub-element. In some implementations, estimation platform 215 may identify a potential impact associated with a hypothesis based on received information, processed information, or the like.

In some implementations, estimation platform 215 may determine whether a hypothesis includes a quantifiable cost impact. For example, estimation platform 215 may determine whether a hypothesis includes a quantifiable cost impact based on a potential impact value associated with the hypothesis. In some implementations, estimation platform 215 may determine that particular hypotheses include quantifiable cost impacts (e.g., may identify a top quantity, percentage, or the like, of hypotheses that are associated with particular values, values that satisfy a threshold value, or the like), may store the particular hypotheses, and may determine impact factors for the hypotheses, as described elsewhere herein.

Additionally, or alternatively, estimation platform 215 may determine that particular hypotheses do not include quantifiable cost impacts, and may store the hypotheses for later usage (e.g., may receive additional information associated with the hypotheses, and may determine impact factors for the hypotheses based on receiving the additional information). In some implementations, estimation platform 215 may periodically (e.g., every six months, every year, every five years, or the like) determine whether hypotheses include quantifiable cost impacts. Additionally, estimation platform 215 may determine impact factors for the hypotheses, as described elsewhere herein.

In some implementations, a hypothesis may be associated with a sub-element. For example, estimation platform 215 may map a hypothesis, and/or a potential impact associated with the hypothesis, to a sub-element (e.g., based on a sub-element identifier). As an example, a particular hypothesis may be associated with a particular potential impact. Further, the hypothesis may be applicable to a particular sub-element, a particular set of sub-elements, or the like. Thus, the potential impact (e.g., a reduction in cost) may be applicable to the particular sub-element or sub-elements, and may affect (e.g., reduce) a cost associated with the particular sub-element(s). Estimation platform 215 may more accurately identify an effect of a hypothesis on a capital expenditure estimate based on mapping the hypothesis to a particular sub-element or sub-elements.

In some implementations, a hypothesis may be associated with a temporal indicator. For example, estimation platform 215 may map a hypothesis with a temporal indicator that identifies a date and/or time associated with the hypothesis (e.g., may indicate that a hypothesis may be applicable in a particular year, or the like). Estimation platform 215 may apply an adoption curve to an impact factor associated with a hypothesis, as described elsewhere herein, based on a temporal indicator associated with the hypothesis.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7B:
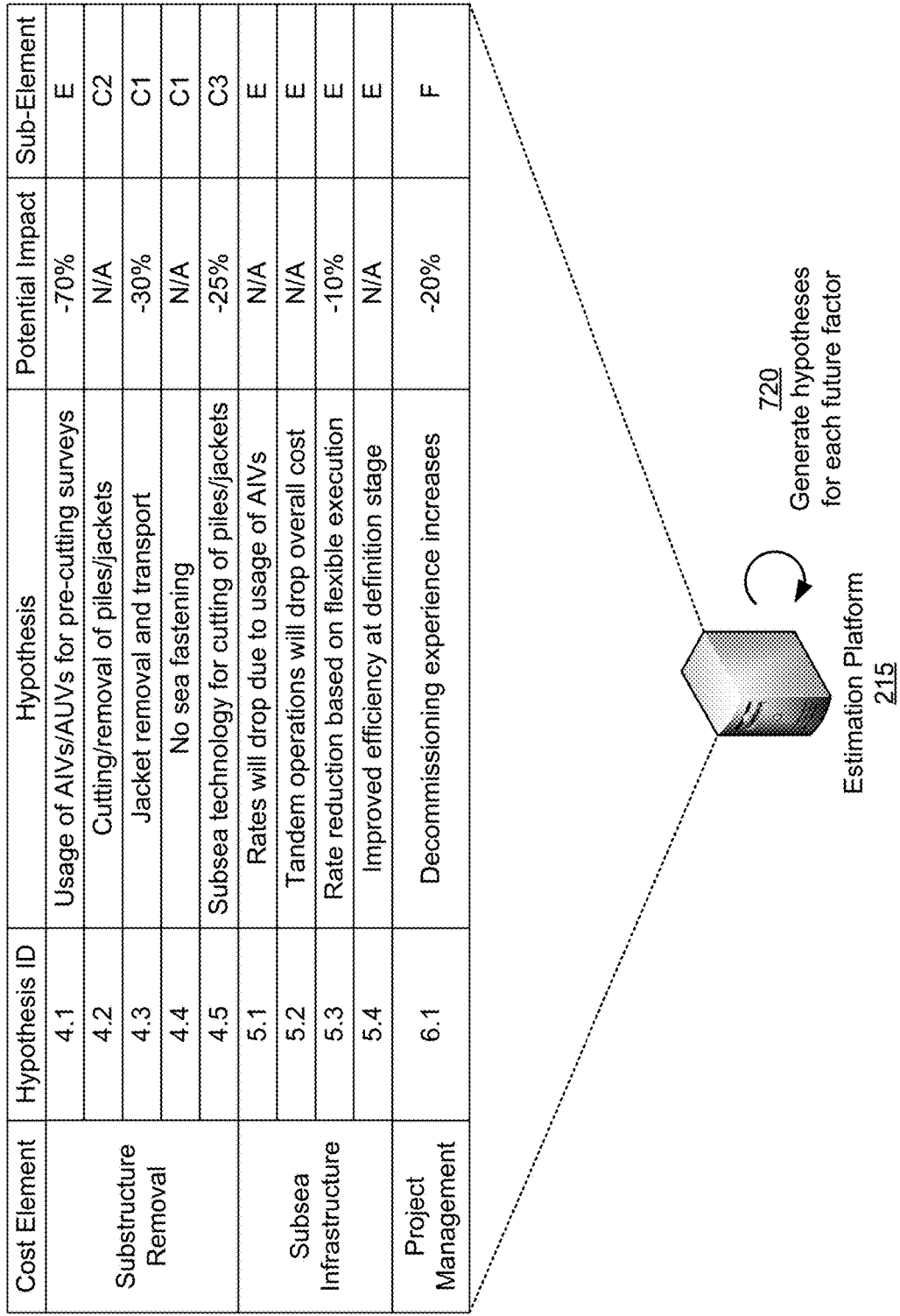

FIGS. 7A and 7B are diagrams of an example implementations 700 relating to example process 600 shown in FIG. 6. FIGS. 7A and 7B show an example of determining a plurality of future factors, associated with the asset, based on the sub-elements and the list of high priority cost elements. Assume that FIGS. 7A and 7B include estimation platform 215.

As shown in FIG. 7A, and by reference number 710, estimation platform 215 may determine future factors associated with the asset. For example, estimation platform 215 may receive, from client device 205, information that identifies multiple future factor categories, such as "new technology," "market," "industry maturity & learning effects," "industry partnership," and "methods." Additionally, as shown, estimation platform 215 may receive information that identifies future factors that are associated with particular future factor categories. For example, as shown, the "market" future factory category may be associated with the future factors: "entry/exit of supply chain players," "increase/decrease in available capacity of existing players," "increase in supply chain decommissioning capabilities," and "new financing/operating models." The future factors may represent factors, associated with the asset and/or capital expenditure project, that may affect a cost estimate associated with the capital expenditure project, and may form bases for hypotheses.

As shown in FIG. 7B, and by reference number 720, estimation platform 215 may generate hypotheses for each future factor. For example, estimation platform 215 may receive, from client device 205 (not shown), information associated with hypotheses and may generate the hypotheses based on the information. For example, as shown, estimation platform 215 may generate the hypothesis "usage of AIVs/ AUVs for pre-cutting surveys" and may map the hypothesis to a particular sub-element based on a sub-element identifier (e.g., "E"). Additionally, as shown, estimation platform 215 may generate a potential impact (−70%) associated with the hypothesis. For example, assume that the usage of AIVs/AUVs may reduce the cost associated with a sub-element associated with the sub-element identifier "E" by 70%.

As indicated above, FIGS. 7A and 7B are provided merely as an example. Other examples are possible and may differ from what was described with regards to FIGS. 7A and 7B.

FIG. 8 is a flow chart of an example process 800 for generating a capital expenditure estimate based on impact factors associated with the hypotheses. In some implementations, one or more process blocks of FIG. 8 may be performed by estimation platform 215. In some implementations, one or more process blocks of FIG. 8 may be performed by another device or a group of devices separate from or including estimation platform 215, such as client device 205, server device 210 and/or asset device 225.

As shown in FIG. 8, process 800 may include determining impact factors for each hypothesis of the hypotheses (block 810). For example, estimation platform 215 may determine an impact factor, for a hypothesis, that may represent an adjusted potential impact value. In some implementations, estimation platform 215 may determine an impact factor based on applying an impact condition to a potential impact value. In some implementations, an impact condition may include a probability value. For example, a probability value may represent a probability of a hypothesis, if developed, being implemented in association with the capital expenditure project. Additionally, or alternatively, an impact condition may include a confidence value. For example, a confidence value may represent a confidence in evidence supporting the hypothesis (e.g., confidence in the hypothesis reaching fruition).

In some implementations, an impact condition may be associated with a designation (e.g., high, medium, low), and/or may be associated with a value (e.g., 85%, 50%, 15%, or the like). Additionally, a designation may be mapped to a value (e.g., "high"=85%). In some implementations, estimation platform 215 may determine an impact factor based on applying a likelihood value and/or a confidence value to a potential impact value. For example, assume that a hypothesis (e.g., that a new type of steel may be available for use in two years) is associated with a particular potential impact value (e.g., −80%), that indicates a percentage reduction in cost associated with a particular sub-element (e.g., manufacturing of a vehicle). Further, assume that the hypothesis is associated with a confidence value (e.g., 90%), which indicates that confidence in the new type of steel being available for use is high. For example, assume that a manufacturer of the new type of steel has produced a prototype. Further still, assume that the hypothesis is associated with a particular probability value (e.g., 10%), which indicates that the likelihood of the new type of steel being used in association with a vehicle is low. For example, assume that government regulation may prevent the new type of steel from being used in association with the vehicle. In this case, estimation platform 215 may generate an impact factor by applying the probability value and the confidence value to the potential impact value (e.g., −80%×90%×10%=−7.2%). Estimation platform 215 may more accurately determine an effect of a hypothesis on a capital expenditure project cost estimate based on impact conditions.

In some implementations, estimation platform 215 may determine an impact factor for a hypothesis based on receiving information identifying the impact factor. For example, estimation platform 215 may receive, from client device 205, information identifying the impact factor (e.g., assigning an impact factor to a hypothesis), information identifying a confidence value, and/or information identifying a likelihood value. Additionally, estimation platform 215 may receive, from client device 205, a validation of an impact factor, a confidence value, and/or a likelihood value.

Additionally, or alternatively, estimation platform 215 may determine an impact factor based on receiving and/or processing information using a technique (e.g., a data mining technique, a web crawling technique, or the like). For example, estimation platform 215 may identify topics, themes, sentiments, or the like, associated with a hypothesis based on applying a technique, and may determine an impact factor based on applying the technique. In some implementations, estimation platform 215 may determine an impact condition based on a particular quantity of information (e.g., quantity of documents, or the like) that is associated with the hypothesis, a source of the information, a frequency in which the hypothesis appears in the information, or the like.

In some implementations, estimation platform 215 may automatically (e.g., without input from a user), and/or periodically (e.g., every six months, every year, every five years, or the like) determine an impact factor for a hypothesis. As an example, estimation platform 215 may determine a first impact factor for a hypothesis (e.g., at a first date), and may periodically update the first impact factor based on additional information associated with the hypothesis. For example, assume that the hypothesis, at the first date, is associated with a particular likelihood and/or that confidence in the hypothesis is associated with a particular value. Further, assume that the likelihood and/or confidence associated with the hypothesis changes (e.g., the hypothesis becomes more likely) in relation to a second date. In this case, estimation platform 215 may adjust the first impact factor based on the hypothesis becoming more likely.

In some implementations, estimation platform 215 may periodically provide requests, to server device 210, for information associated with a hypothesis. For example, assume that a hypothesis is associated with usage of AUVs for pre-cutting surveys. In this case, estimation platform 215 may provide a request, to server device 210 (e.g., a server device associated with a manufacturer of the AUV), for information associated with an anticipated AUV (e.g., that is being developed). For example, estimation platform 215 may request information, such as company literature, specification sheets, order forms, marketing materials, or the like, associated with the AUV. Additionally, estimation platform 215 may adjust an impact factor associated with the hypothesis based on receiving information associated with the request (e.g., based on whether the hypothesis seems more or less likely, and/or based on a confidence in evidence supporting the hypothesis).

Estimation platform 215 may determine an impact factor, associated with a hypothesis, based on a likelihood value and/or a confidence value associated with the hypothesis. Additionally, estimation platform 215 may more accurately identify an impact, associated with a hypothesis, on a cost estimate associated with a capital expenditure project.

As further shown in FIG. 8, process 800 may include applying an adoption curve to each of the impact factors (block 820), and generating a final impact factor for each hypothesis of the hypotheses (block 830). For example, estimation platform 215 may apply an adoption curve to an impact factor to adjust the impact factor, and generate a final impact factor for each hypothesis of the hypotheses. In some implementations, estimation platform 215 may map an impact factor to an adoption curve to adjust a value associated with an impact factor based on a temporal indicator (e.g., a date and/or time).

In some implementations, estimation platform 215 may apply an adoption curve to an impact factor based on a future factor category associated with the hypothesis. For example, estimation platform 215 may apply a technology adoption curve, a process and/or methodology adoption curve, a legislation adoption curve, or the like, based on a future factor category associated with the hypothesis and impact factor.

In some implementations, an adoption curve may include an adoption percentage value and/or an impact maturity value that may be associated with a temporal indicator. For example, a technology adoption curve may include a particular adoption percentage value (e.g., 60%) and a particular impact maturity value (e.g., 95%) associated with a particular temporal indicator (e.g., 9 years). In this case, the adoption percentage value may indicate that, after nine years of availability, 60% of the market, industry, or the like, is using a particular technology. Further, the impact maturity value indicate that, after nine years and/or based on 60% of the market using the particular technology, 95% of the benefit of the technology is realized.

In some implementations, different adoption curves (e.g., technology, process and/or methodology, and/or legislation adoption curves) may include different adoption percentage values and/or impact maturity values based on a temporal indicator. Additionally, estimation platform 215 may apply an adoption curve to an impact factor to adjust the impact factor based on a time and/or date, as described elsewhere herein.

In some implementations, estimation platform 215 may generate a final impact factor for each hypothesis of the hypotheses based on applying an adoption curve to each of the impact factors. A final impact factor may include a potential impact value that has been adjusted based on an impact condition and/or an adoption curve. In some implementations, estimation platform 215 may generate a final impact factor for a hypothesis based on a temporal indicator associated with the hypothesis. For example, estimation platform 215 may apply an adoption percentage value and/or an impact maturity value to an impact factor value to generate a final impact factor value. Additionally, final impact factor values may be dependent on a temporal indicator associated with the impact factor. For example, final impact factor values may depend on a capital expenditure project execution date, and/or may depend on a date associated with a hypothesis.

As further shown in FIG. 8, process 800 may include aggregating the final impact factors into a final aggregated future factor impact (block 840), and generating a capital expenditure estimate for the asset based on the final aggregated future factor impact (block 850). For example, estimation platform 215 may aggregate the final impact factors and may generate a capital expenditure estimate for the asset based on a final aggregated future factor impact.

In some implementations, estimation platform 215 may determine a final future factor impact, for a cost element, based on applying one or more final impact factor values to one or more sub-elements associated with the cost element. For example, estimation platform 215 may apply a final impact factor value, associated with a hypothesis, to a particular contribution percentage value of a sub-element based on a sub-element identifier associated with the hypothesis. Additionally, estimation platform 215 may determine a final aggregated future factor impact based on aggregating final future factor impact values for each cost element associated with the capital expenditure project cost estimate. In some implementations, the final aggregated future factor impact value may represent a total change in cost associated with a capital expenditure project cost estimate (e.g., based on an aggregation of each final impact factor associated with each hypothesis).

In some implementations, estimation platform 215 may generate a capital expenditure estimate for the asset based on determining the final aggregated future factor impact value. In some implementations, the capital expenditure estimate may include the final aggregated future factor impact value (e.g., representing a total reduction in cost associated with a capital expenditure project cost estimate). Additionally, or alternatively, the capital expenditure estimate may include multiple final future factor impact values corresponding to each cost element associated with the capital expenditure project cost estimate (e.g., representing an impact of a change in cost, associated with a cost element, to an overall cost associated with a capital expenditure project cost estimate). Additionally, or alternatively, the capital expenditure estimate may include multiple final future factor impact values associated with each cost element (e.g., representing an impact of each hypothesis to a change in cost associated with a particular cost element).

In some implementations, estimation platform 215 may receive, from client device 205, information that identifies a selection that applies one or more hypotheses to an asset. For example, estimation platform 215 may aggregate one or more final impact factor values, associated with one or more hypotheses, to generate a final aggregated future factor impact value based on a selection of the one or more hypotheses. Additionally, estimation platform 215 may generate a capital expenditure estimate, associated with an asset, based on an application of particular hypotheses. Additionally, assume that a capital expenditure project is associated with multiple assets. Additionally, estimation platform 215 may apply particular hypotheses to particular assets, and may generate a capital expenditure estimate based on the application of the particular hypotheses to the particular assets.

In some implementations, estimation platform 215 may generate a capital expenditure estimate based on a temporal indicator. For example, estimation platform 215 may generate a capital expenditure estimate based on a project execution date and/or time. Additionally, estimation platform 215 may generate multiple capital expenditure estimates, corresponding to different project execution dates and/or times, which may enable estimation platform 215 to compare final aggregated future factor impact values per the different project execution dates and/or times. In some implementations, application of an adoption curve may yield different final impact factor values of hypotheses based on a temporal indicator, thus final aggregated future factor impact values may depend on a temporal indicator (e.g., may change based on a project execution date and/or time). Estimation platform 215 may compare final aggregated future factor impact values per the different project execution dates and/or times to determine a project execution time and/or date (e.g., a project execution time and/or date that may optimize a cost reduction associated with the capital expenditure project).

In some implementations, estimation platform 215 may automatically and/or periodically generate a capital expenditure estimate. For example, estimation platform 215 may generate a capital expenditure estimate based on determining an impact factor and/or a final impact factor for a hypothesis (e.g., an updated impact factor or final impact factor). For example, as described above in connection with block 810, estimation platform 215 may automatically and/or periodically adjust an impact factor associated with a hypothesis (e.g., based on receiving additional information that affects a likelihood value and/or confidence value associated with the hypothesis).

In some implementations, multiple impact factors, associated with multiple hypotheses, may affect a capital expenditure estimate. As an example, assume that estimation platform 215 generates, at a first time, a first capital expenditure estimate associated with a particular project execution date (e.g., 2032). Additionally, assume that estimation platform 215 generates, at a second time (e.g., five years after the first date), a second capital expenditure estimate associated with the particular project execution date. In some cases, estimation platform 215 may determine that the second capital expenditure estimate is lower (e.g., is associated with a lower cost) than the first capital expenditure estimate (e.g., because one or more hypotheses are more likely).

In some implementations, estimation platform 215 may determine a target project execution date. For example, estimation platform 215 may determine a target project execution date based on determining that a capital expenditure estimate satisfies a threshold value. A target project execution date may include a project execution date that is associated with a capital expenditure estimate that satisfies a threshold value. In some implementations, estimation platform 215 may receive, from client device 205, information that identifies the threshold value. Additionally, or alternatively, estimation platform 215 may determine the threshold value based on comparing multiple capital expenditure estimates. For example, assume that estimation platform 215 generates multiple capital expenditure estimates that each correspond to different project execution dates. In this case, estimation platform 215 may identify a particular project execution date (e.g., associated with the lowest cost estimate) based on the capital expenditure estimates.

Additionally, or alternatively, estimation platform 215 may identify a particular project execution date based on capital expenditure estimates, associated with later project execution dates, not satisfying a threshold value. For example, assume that a cost estimate associated with the capital expenditure project does not decrease by more than a threshold value with each progressive year (e.g., subsequent project execution dates). In this case, estimation platform 215 may determine a target project execution date based on subsequent capital expenditure estimates not satisfying the threshold value.

In some implementations, estimation platform 215 may determine a target project execution date based on differences in capital expenditure estimates, associated with the target project execution date, not satisfying a threshold value. For example, estimation platform 215 may generate, at a first time, a first capital expenditure estimate for a particular project execution date. Additionally, estimation platform 215, may generate, at a second time (e.g., a year, three years, or the like subsequent to the first time), a second capital expenditure estimate for the particular project execution date, and may compare the first and second capital expenditure estimates. In some implementation, estimation platform 215 may determine that the particular project execution date is the target project execution date based on a difference between the second and first capital expenditure estimates not satisfying a threshold value. For example, assume that final impact factors do not significantly change based on the first time and the second time. In this case, estimation platform 215 may determine that the target project execution date is an optimal project execution date (e.g., costs may not significantly decrease as time progresses). In some implementations, estimation platform 215 may cause and/or permit an action to be performed based on a target project execution date, as described below.

As further shown in FIG. 8, process 800 may include providing the capital expenditure estimate to permit and/or cause an action to be performed (block 860). For example, estimation platform 215 may provide, to another device, such as client device 205 and/or asset device 225, the capital expenditure estimate to permit and/or cause an action to be performed. In some implementations, estimation platform 215 may provide, to client device 205 (e.g., which may provide for display via a user interface), the capital expenditure estimate. Additionally, or alternatively, estimation platform 215 may provide information that identifies a hypothesis and/or a potential impact value, impact conditions, an adoption curve, and/or a final impact factor associated with the hypothesis.

In some implementations, estimation platform 215 may permit and/or cause an action to be performed based on generating a capital expenditure estimate. For example, estimation platform 215 may perform an action and/or may cause another device to perform an action based on generating a capital expenditure estimate. In some implementations, estimation platform 215 may provide, and/or cause another device to provide, a message to client device 205 based on generating a capital expenditure estimate. For example, estimation platform 215 may cause a message (e.g., an email or a short message service (SMS) message) to be sent to client device 205 based on generating a capital expenditure estimate. In this way, estimation platform 215 may notify a user that a particular date and/or time may be associated with a particular capital expenditure estimate, which may enable a user to determine a project execution date and/or time based on the particular capital expenditure estimate.

Additionally, or alternatively, estimation platform 215 may coordinate client devices 205 based on generating a capital expenditure estimate. For example, estimation platform 215 may coordinate client devices 205 (e.g., coordinate calendar applications associated with client devices 205 to schedule a meeting), and may provide information associated with the capital expenditure estimate. Additionally, or alternatively, estimation platform 215 may coordinate client devices periodically (e.g., weekly, monthly, or the like) based on generating capital expenditure estimates. Additionally, a user may receive an indication that a meeting has been scheduled to discuss the capital expenditure estimate and/or to determine a project execution date based on the capital expenditure estimate.

Additionally, or alternatively, estimation platform 215 may cause another device, such as asset device 225, to perform an action (e.g., decommission, or the like) associated with a capital expenditure project based on instructions from estimation platform 215. For example, a capital expenditure project execution date and/or time may be triggered or controlled by estimation platform 215. Additionally, estimation platform 215 may determine a particular capital expenditure project execution date and/or time, based on generating a capital expenditure estimate, and may cause asset device 225 to perform an action (e.g., execute a project). Additionally, or alternatively, estimation platform 215 may cause another action to be performed in association with the capital expenditure project (e.g., may cause a replacement part associated with the asset to be ordered, may cause an entity to be billed in association with the asset, may cause a replacement asset to be ordered, or the like).

In some implementations, estimation platform 215 may cause an action to be performed based on a target project execution date. For example, estimation platform 215 may determine that a particular date (e.g., a present date) is within a threshold timeframe (e.g., within a particular quantity of days, months, years, or the like or coinciding with the target project execution date) of the target project execution date and may cause an action to be performed based on the particular date being within the threshold timeframe.

In some implementations, estimation platform 215 may cause asset device 225 to decommission, commission, or the like based on the target project execution date. For example, assume that the asset is an offshore platform and/or that asset device 225 is associated with the offshore platform. In this case, estimation platform 215 may cause asset device to decommission based on a date being within a threshold timeframe of the project execution date and/or coinciding with the project execution date.

Additionally, or alternatively, estimation platform 215 may cause an organization, entity, company, contractor, or the like, associated with the capital expenditure project to be scheduled to perform a task based on a date being within a threshold timeframe of the target project execution date. For example, estimation platform 215 may identify a contractor associated with the capital expenditure project (e.g., based on a work breakdown structure, a work scope, or the like), and may cause a scheduling of the contractor to perform a task related to the capital expenditure project.

Additionally, or alternatively, estimation platform 215 may cause equipment, supplies, or the like, to be ordered based on a date being within a threshold timeframe of the target project execution date. For example, estimation platform 215 may provide a request, to server device 210, for information that identifies equipment and/or supplies that are needed for the capital expenditure project, and may receive the information based on the request. Additionally, estimation platform 215 may identify a manufacturer, a company, or the like, associated with the equipment, and may cause an order to be placed for the equipment based on a date being within a threshold timeframe of the target project execution date.

Additionally, or alternatively, estimation platform 215 may cause a permit, license, or the like, to be applied for based on a date being within a threshold timeframe of a target project execution date. For example, assume that the capital expenditure project requires a governing entity, a regulatory agency, or the like, to issue a permit before the capital expenditure project may be carried out. In this case, estimation platform 215 may cause a permit to be applied for based on a date being within a threshold timeframe of the target project execution date.

In some implementations, estimation platform 215 may cause another asset (e.g., associated with a particular asset device 225) to perform an action (e.g., commission) based on a date being with a threshold timeframe of the target project execution date. For example, assume that the capital expenditure project is associated with decommissioning a particular asset (e.g., a first offshore platform). In this case, estimation platform 215 may cause another asset (e.g., a second offshore platform) to commission based on the date being with the threshold timeframe of the target project execution date (e.g., to replace the first offshore platform that is slated to be decommissioned).

Implementations described herein may enable estimation platform 215 to determine capital expenditure estimates for assets based on future factors, and may enable estimation platform 215 to determine the effects of such future factors on capital expenditure estimates for the assets. Thus, implementations described herein may enable informed decision making throughout the lifespan of a capital expenditure project. Additionally, implementations described herein may reduce a quantity of manual processing of capital expenditure project estimates, thereby conserving processor and/or memory resources of devices associated with a capital expenditure project.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
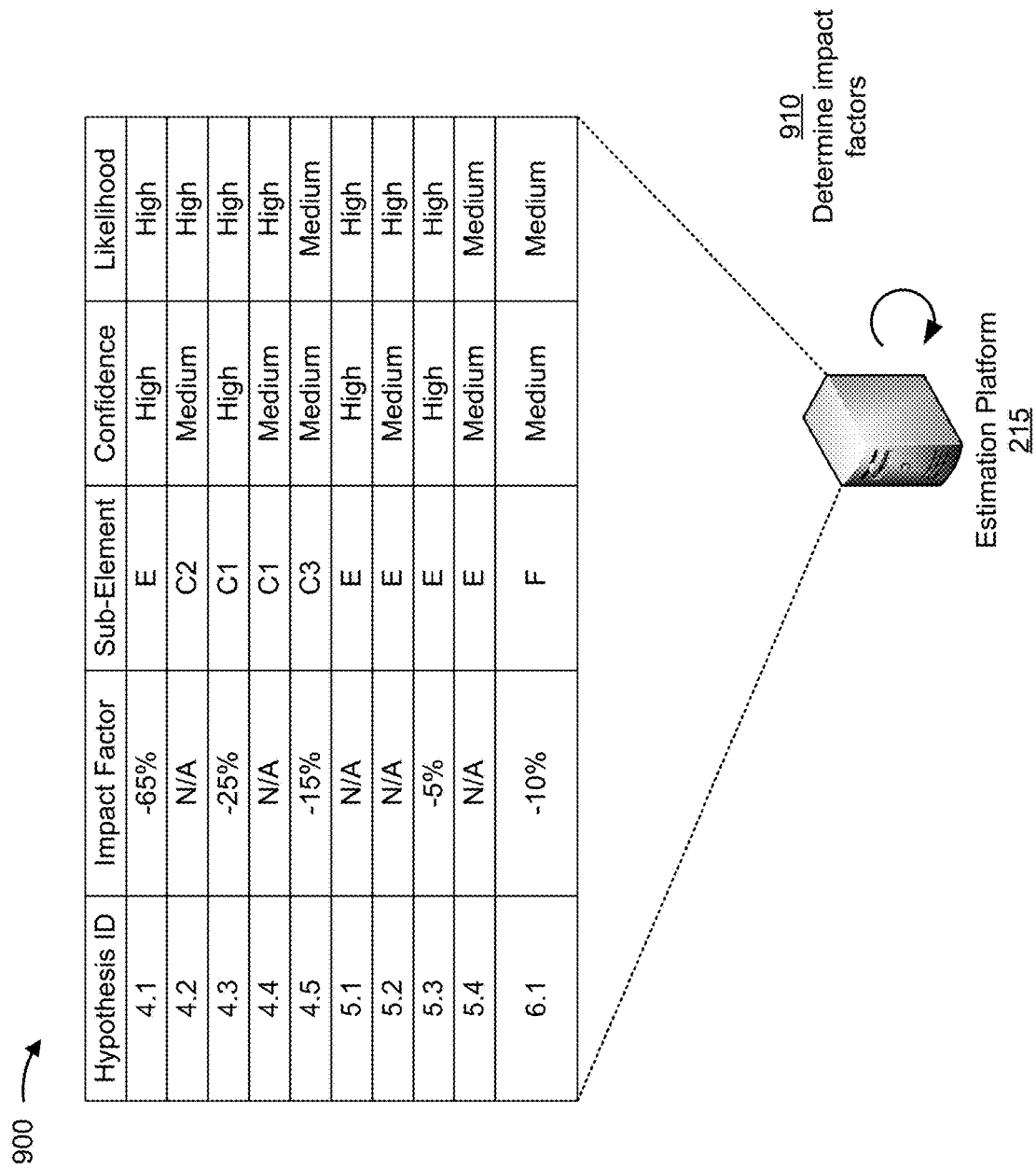
FIGS. 9A-9C are diagrams of an example implementation relating to the example process shown in FIG. 8.
Figure 9B:
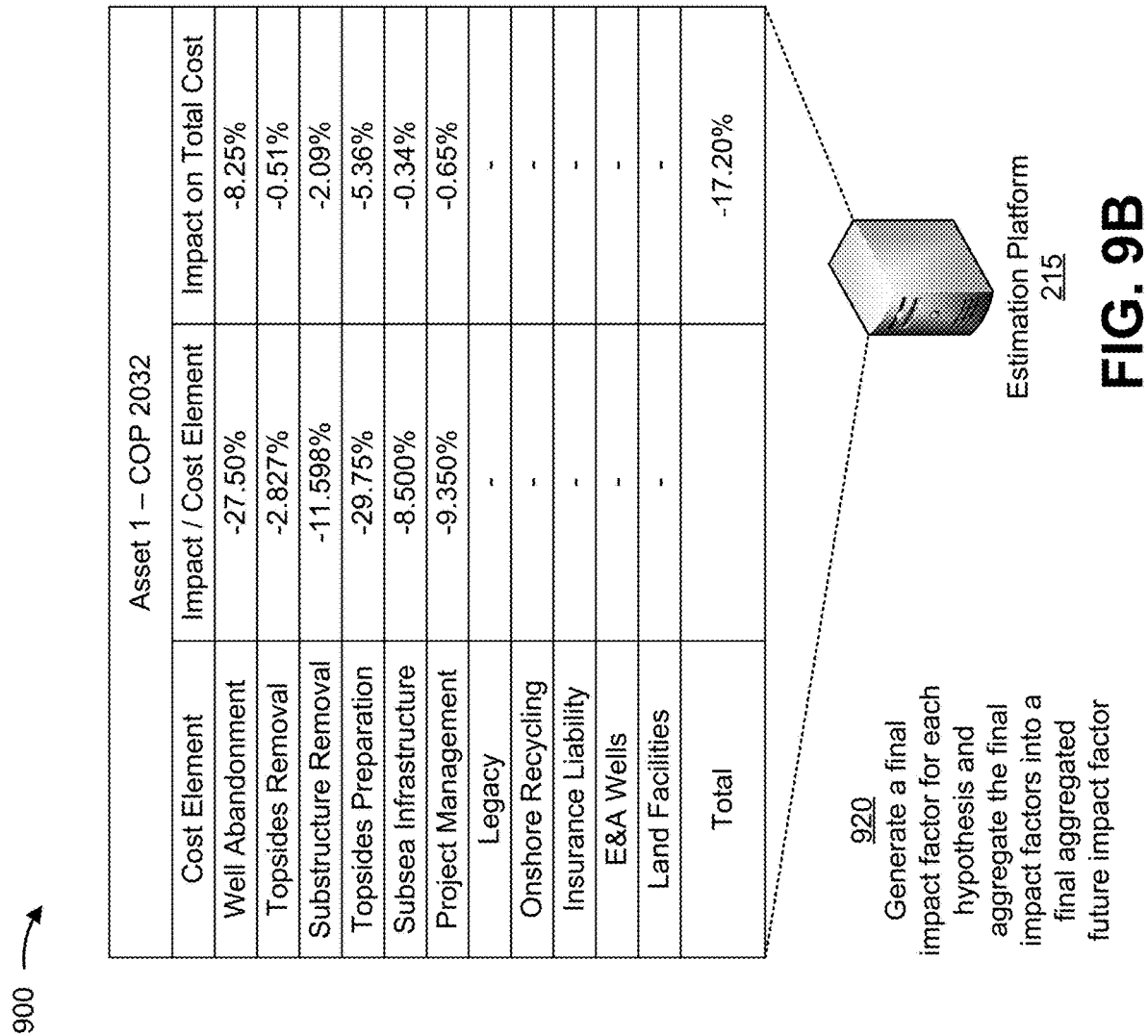
Figure 9C:
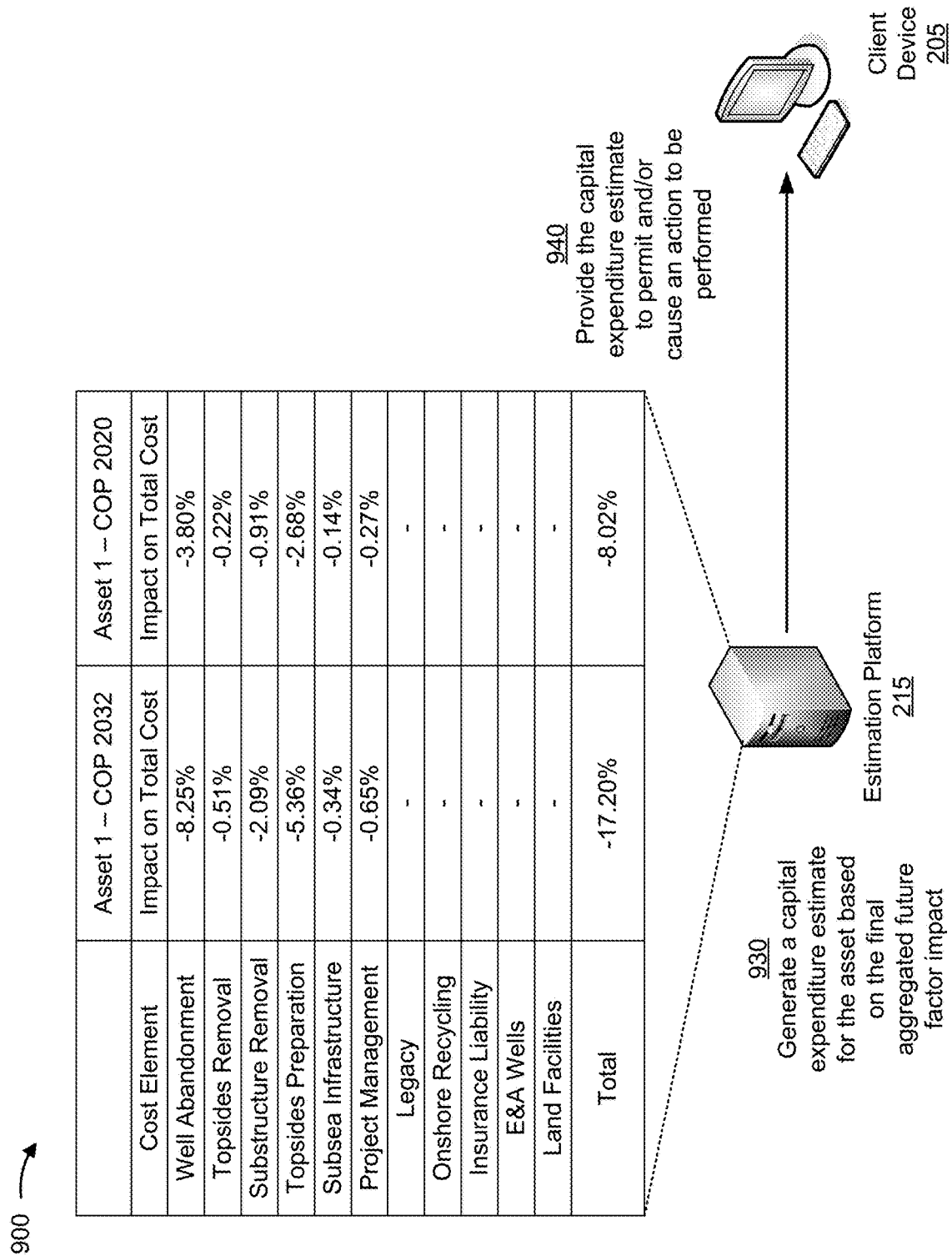

FIGS. 9A-9C are diagrams of an example implementations 900 relating to example process 800 shown in FIG. 8. FIGS. 9A-9C show an example of generating a capital expenditure estimate based on impact factors associated with the hypotheses. Assume that FIGS. 9A-9C include estimation platform 215 and client device 205 (e.g., being used by a user).

As shown in FIG. 9A, and by reference number 910, estimation platform 215 may determine final impact factors for one or more hypotheses. For example, as shown, estimation platform 215 may generate a final impact factor (e.g., −65%), for a particular hypothesis (e.g., "usage of AIVs/AUVs for pre-cutting survey") based on applying a confidence value (e.g. "high") and a likelihood value (e.g., "high") to a potential impact value associated with the hypothesis. For example, assume that AUVs are being developed for usage in association with pre-cutting surveys (e.g., resulting in a high confidence score), and that no barriers exist in terms of using AUVs for the particular task (e.g., resulting in a high likelihood score). In this case, estimation platform 215 may determine a final impact factor that is similar to the potential impact (e.g., −70%) associated with the hypothesis (e.g., because the hypothesis seems likely).

As shown in FIG. 9B, and by reference number 920, estimation platform 215 may generate a final impact factor for each hypothesis and aggregate the final impact factors into a final aggregated future factor impact. For example, estimation platform 215 may apply an adoption curve to a final impact factor and may generate a final impact factor for an underlying hypothesis. For example, assume that a hypothesis (e.g., "usage of AIVs/AUVs for pre-cutting survey") is associated with a temporal indicator (e.g., AUVs are hypothesized to be available for use in ten years from a present date). In this case, a final impact factor associated with the hypothesis may depend on a particular date and/or time. For example, AUVs may be available for use in ten years, however, the full benefit of such technology may not be realized until a particular amount of time afterwards (e.g., based on an adoption curve).

As further shown, estimation platform 215 may determine final impact factor values per cost element. For example, estimation platform 215 may aggregate final impact factor values, for each hypothesis that applies to a particular cost element, and may determine a final future factor impact value. As shown, assume that hypotheses, associated with the cost element "well abandonment," are associated with final impact factor values, such that a reduction in cost associated with the cost element is 27.50% for a particular project execution date (e.g., cessation of production (COP) slated for 2032). Additionally, as shown, estimation platform 215 may determine a final aggregated future factor impact value, associated with a particular cost element, on a total cost associated with the capital expenditure estimate. For example, as shown, hypotheses associated with the cost element "well abandonment" may be associated with particular final impact factor values, such that a final future factor impact value of the cost element may result in an 8.25% reduction in cost of the capital expenditure project.

Additionally, as shown, estimation platform 215 may aggregate final future factor impact values, associated with each cost element, to determine a final aggregated future factor impact value. For example, as shown, estimation platform 215 may determine that final future factor impact values, associated with each hypothesis, may result in a 17.20% reduction in cost of the capital expenditure project for a particular project execution date (e.g., COP slated for 2032).

As shown in FIG. 9C, and by reference number 930, estimation platform 215 may generate a capital expenditure estimate for the asset based on the final aggregated future factor impact. For example, as shown, the capital expenditure estimate may include the final aggregated future factor impact value and/or may include final future factor impact values for each cost element associated with the capital expenditure project. Additionally, as shown, estimation platform 215 may generate capital expenditure estimates for multiple project execution dates (e.g., COP slated for 2032 versus COP slated for 2020).

As further shown in FIG. 9C, and by reference number 940, estimation platform 215 may provide, to client device 205, the capital expenditure estimate to permit and/or cause an action to be performed. A user may compare final future factor impact values, for multiple project execution dates, and may determine an optimal project execution date based on the capital expenditure estimates.

As indicated above, FIGS. 9A-9C are provided merely as an example. Other examples are possible and may differ from what was described with regards to FIGS. 9A-9C.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive, from one or more other devices and via a network, first information associated with an asset device,
the asset device being associated with a project;
determine a plurality of cost elements associated with the project based on the first information;
determine a plurality of sub-elements associated with the project based on the plurality of cost elements and the first information;
generate a plurality of hypotheses corresponding to the plurality of sub-elements;
receive, from the one or more other devices and via the network, second information associated with the hypotheses;
determine impact factors associated with the plurality of hypotheses based on the second information,
where the one or more processors, when determining the impact factors, are to:
determine an impact factor, of the impact factors, by multiplying a confidence value, a probability value, and a potential impact value,
the confidence value representing a confidence in a hypothesis, of the hypotheses, the probability value representing a probability of the hypothesis being implemented in association with the project, and the potential impact value representing a reduction in cost associated with the hypothesis;

generate an estimate based on the impact factors;

determine a project execution date, associated with the project, based on the estimate; and control execution of the project based on a present date being within a threshold timeframe of the project execution date, where the one or more processors, when controlling execution of the project, are to:

coordinate calendar applications associated with client devices periodically during a lifespan of the project, transmit instructions to the asset device, and trigger the asset device to execute at least a portion of the project based on transmitting the instructions; and cause decommissioning for the project by automatically shutting down the asset device based on transmitting the instructions.

2. The device of claim 1, where the one or more processors are further to:

receive, from the one or more other devices and via the network, third information associated with the hypotheses;

determine other impact factors associated with the plurality of hypotheses based on the third information;

generate another estimate based on the other impact factors, the estimate being generated at a first time, and the other estimate being generated at a second time that is different than the first time; and where the one or more processors, when determining the project execution date, are to:

determine the project execution date based on the estimate and the other estimate.

3. The device of claim 1, where the one or more processors are further to:

provide, to the one or more other devices, a request for the first information; and where the one or more processors, when receiving the first information associated with the asset device, are to:

receive the first information based on the request.

4. The device of claim 1, where the one or more processors are further to:

map first values, associated with the sub-elements, to second values associated with the cost elements; and where the one or more processors, when generating the impact factors, are to:

generate the impact factors based on mapping the first values to the second values.

5. The device of claim 1, where the one or more processors are further to:

receive third information that identifies a plurality of variance factors associated with the cost elements; and where the one or more processors, when generating the hypotheses, are to:

generate the hypotheses based on the variance factors.

6. The device of claim 1, where the one or more processors are further to:

cause equipment to be ordered based on the present date being within the threshold timeframe.

7. The device of claim 1, where the device includes at least one hypervisor that configures multiple operating systems to execute concurrently to determine the impact factors.

8. A method, comprising:

receiving, by a device and from one or more other devices via a network, first information associated with an asset device, the asset device being associated with a project;

determining, by the device, a plurality of cost elements associated with the project based on the first information;

determining, by the device, a plurality of sub-elements associated with the project based on the plurality of cost elements and the first information;

generate a plurality of hypotheses corresponding to the plurality of sub-elements;

receiving, by the device and from the one or more other devices via the network, second information associated with the hypotheses;

determining, by the device, impact factors associated with the plurality of hypotheses based on the second information, where determining the impact factors comprises:

determining an impact factor, of the impact factors, by multiplying a confidence value, a probability value, and a potential impact value, the confidence value representing a confidence in a hypothesis, of the hypotheses, the probability value representing a probability of the hypothesis being implemented in association with the project, and the potential impact value representing a reduction in cost associated with the hypothesis;

generating, by the device, an estimate based on the impact factors;

determining, by the device, a project execution date, associated with decommissioning for the project, based on the estimate;

controlling, by the device, execution of the project based on a present date being within a threshold timeframe of the project execution date;

where controlling execution of the project comprises:

coordinating calendar applications associated with client devices periodically during a lifespan of the project;

transmitting instructions to the asset device; and triggering the asset device to execute at least a portion of the project based on transmitting the instructions; and causing, by the device, decommissioning for the project by automatically shutting down the asset device based on transmitting the instructions.

9. The method of claim 8, further comprising:

receiving, from the one or more other devices and via the network, third information associated with the hypotheses;

determining other impact factors associated with the plurality of hypotheses based on the third information;

generating another estimate based on the other impact factors, the estimate being generated at a first time, and the other estimate being generated at a second time that is different than the first time; and where determining the project execution date includes:

determining the project execution date based on the estimate and the other estimate.

10. The method of claim 8, further comprising:
providing, to the one or more other devices, a request for the first information; and
where receiving the first information associated with the asset device includes:
receiving the first information based on the request.

11. The method of claim 8, further comprising:
mapping first values, associated with the sub-elements, to second values associated with the cost elements; and
where generating the impact factors includes:
generating the impact factors based on mapping the first values to the second values.

12. The method of claim 8, further comprising:
receiving third information that identifies a plurality of variance factors associated with the cost elements; and
where generating the hypotheses includes:
generating the hypotheses based on the variance factors.

13. The method of claim 8, further comprising:
causing equipment to be ordered based on the present date being within the threshold timeframe.

14. The method of claim 8, where the device includes at least one hypervisor that configures multiple operating systems to execute concurrently to determine the impact factors.

15. A non-transitory computer-readable medium storing instructions, the instructions comprising:
one or more instructions that, when executed by one or more processors of a device, cause the one or more processors to:
receive, from one or more other devices and via a network, first information associated with an asset device,
the asset device being associated with a project;
determine a plurality of cost elements associated with the project based on the first information;
determine a plurality of sub-elements associated with the project based on the plurality of cost elements and the first information;
generate a plurality of hypotheses corresponding to the plurality of sub-elements;
receive, from the one or more other devices and via the network, second information associated with the hypotheses;
determine impact factors associated with the plurality of hypotheses based on the second information,
where the one or more instructions, that cause the one or more processors to determine the impact factors, cause the one or more processors to:
determine an impact factor, of the impact factors, by multiplying a confidence value, a probability value, and a potential impact value,
the confidence value representing a confidence in a hypothesis, of the hypotheses,
the probability value representing a probability of the hypothesis being implemented in association with the project, and
the potential impact value representing a reduction in cost associated with the hypothesis;
generate an estimate based on the impact factors;
determine a project execution date, associated with the project, based on the estimate;
control execution of the project based on a present date being within a threshold timeframe of the project execution date;
where the one or more instructions, that cause the one or more processors to control execution of the project, cause the one or more processors to:
coordinate calendar applications associated with client devices periodically during a lifespan of the project;
transmit instructions to the asset device; and
trigger the asset device to execute at least a portion of the project based on transmitting the instructions; and
cause decommissioning for the project by automatically shutting down the asset device based on transmitting the instructions.

16. The non-transitory computer-readable medium of claim 15, where the one or more instructions, when executed by the one or more processors, further cause the one or more processors to:
receive, from the one or more other devices and via the network, third information associated with the hypotheses;
determine other impact factors associated with the plurality of hypotheses based on the third information;
generate another estimate based on the other impact factors,
the estimate being generated at a first time, and
the other estimate being generated at a second time that is different than the first time; and
where the one or more instructions, that cause the one or more processors to determine the project execution date, cause the one or more processors to:
determine the project execution date based on the estimate and the other estimate.

17. The non-transitory computer-readable medium of claim 15, where the one or more instructions, when executed by the one or more processors, further cause the one or more processors to:
provide, to the one or more other devices, a request for the first information; and
where the one or more instructions, that cause the one or more processors to receive the first information associated with the asset device, cause the one or more processors to:
receive the first information based on the request.

18. The non-transitory computer-readable medium of claim 15, where the one or more instructions, when executed by the one or more processors, further cause the one or more processors to:
map first values, associated with the sub-elements, to second values associated with the cost elements; and
where the one or more instructions, that cause the one or more processors to generate the impact factors, cause the one or more processors to:
generate the impact factors based on mapping the first values to the second values.

19. The non-transitory computer-readable medium of claim 15, where the one or more instructions, when executed by the one or more processors, further cause the one or more processors to:
receive third information that identifies a plurality of variance factors associated with the cost elements; and
where the one or more instructions, that cause the one or more processors to generate the hypotheses, cause the one or more processors to:
generate the hypotheses based on the variance factors.

20. The non-transitory computer-readable medium of claim 15, where the one or more instructions, when executed by the one or more processors, further cause the one or more processors to:
 cause equipment supplies to be ordered based on the present date being within the threshold timeframe.

\* \* \* \* \*